June 4, 1929.  A. H. HAWLEY  1,715,704
ACCOUNTING MACHINE
Original Filed June 9, 1917  13 Sheets-Sheet 1

WITNESS:
E.H.Wagner,

INVENTOR
A. H. Hawley
ATTORNEY

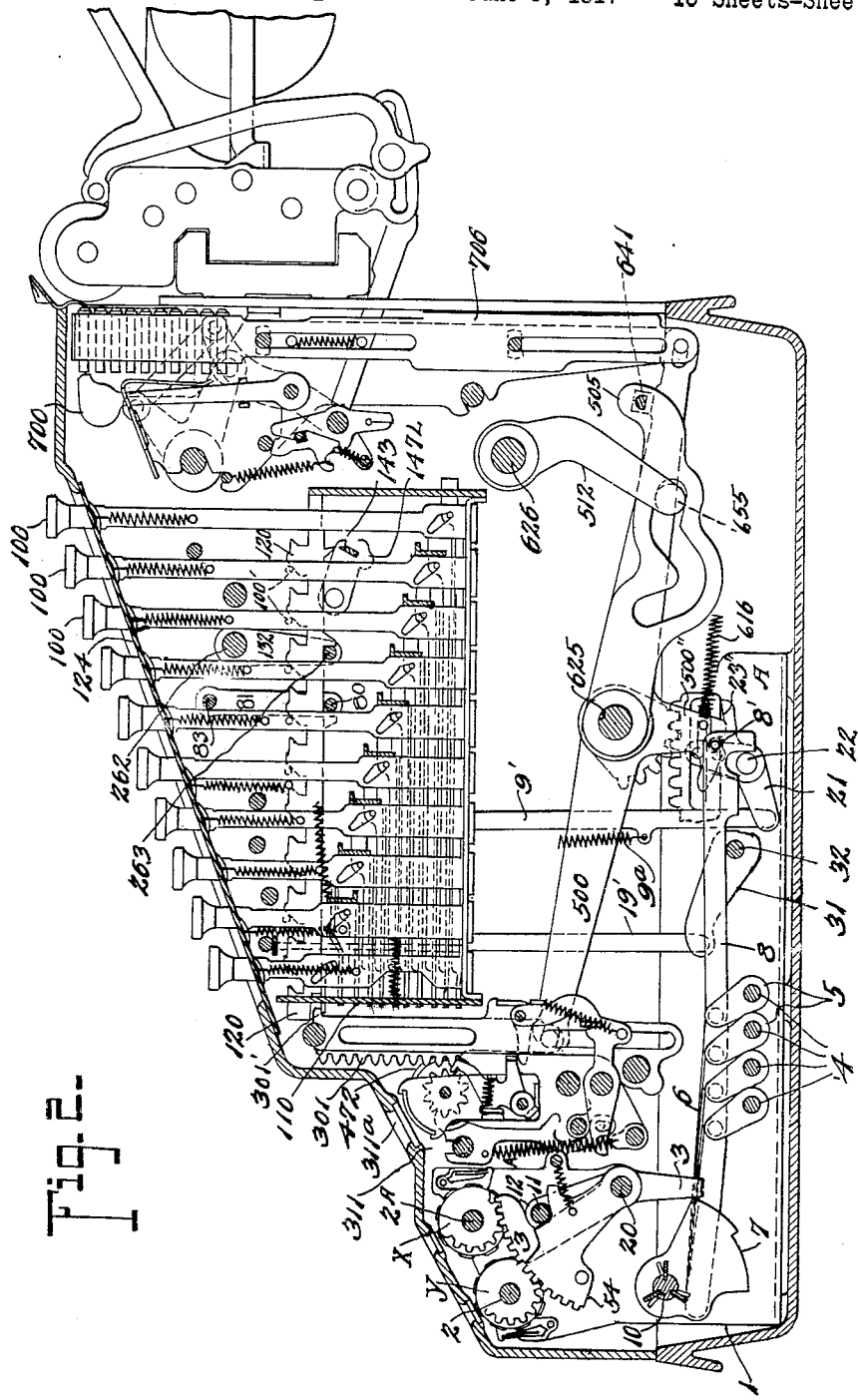

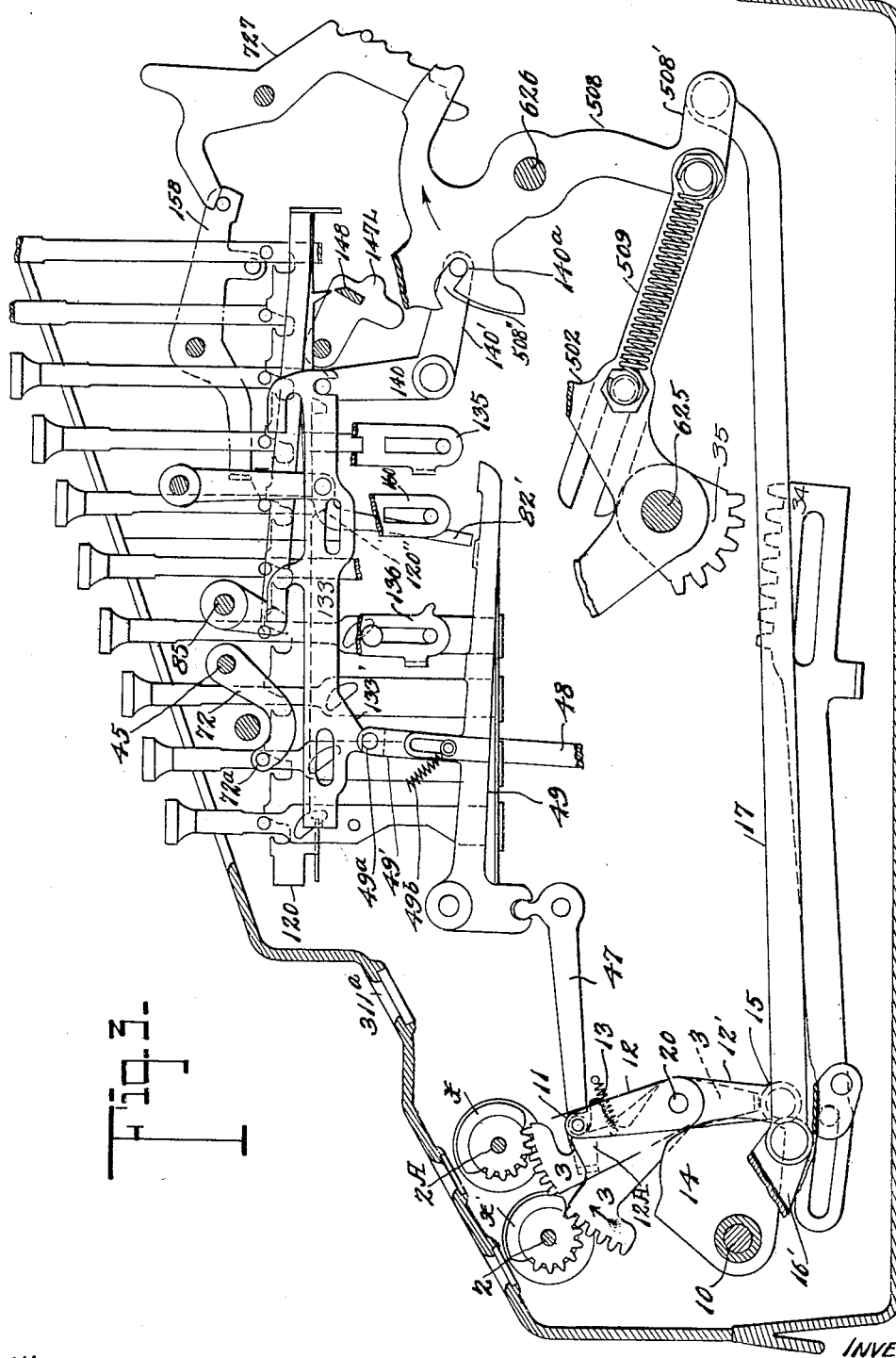

June 4, 1929.　　A. H. HAWLEY　　1,715,704
ACCOUNTING MACHINE
Original Filed June 9, 1917　　13 Sheets-Sheet 4
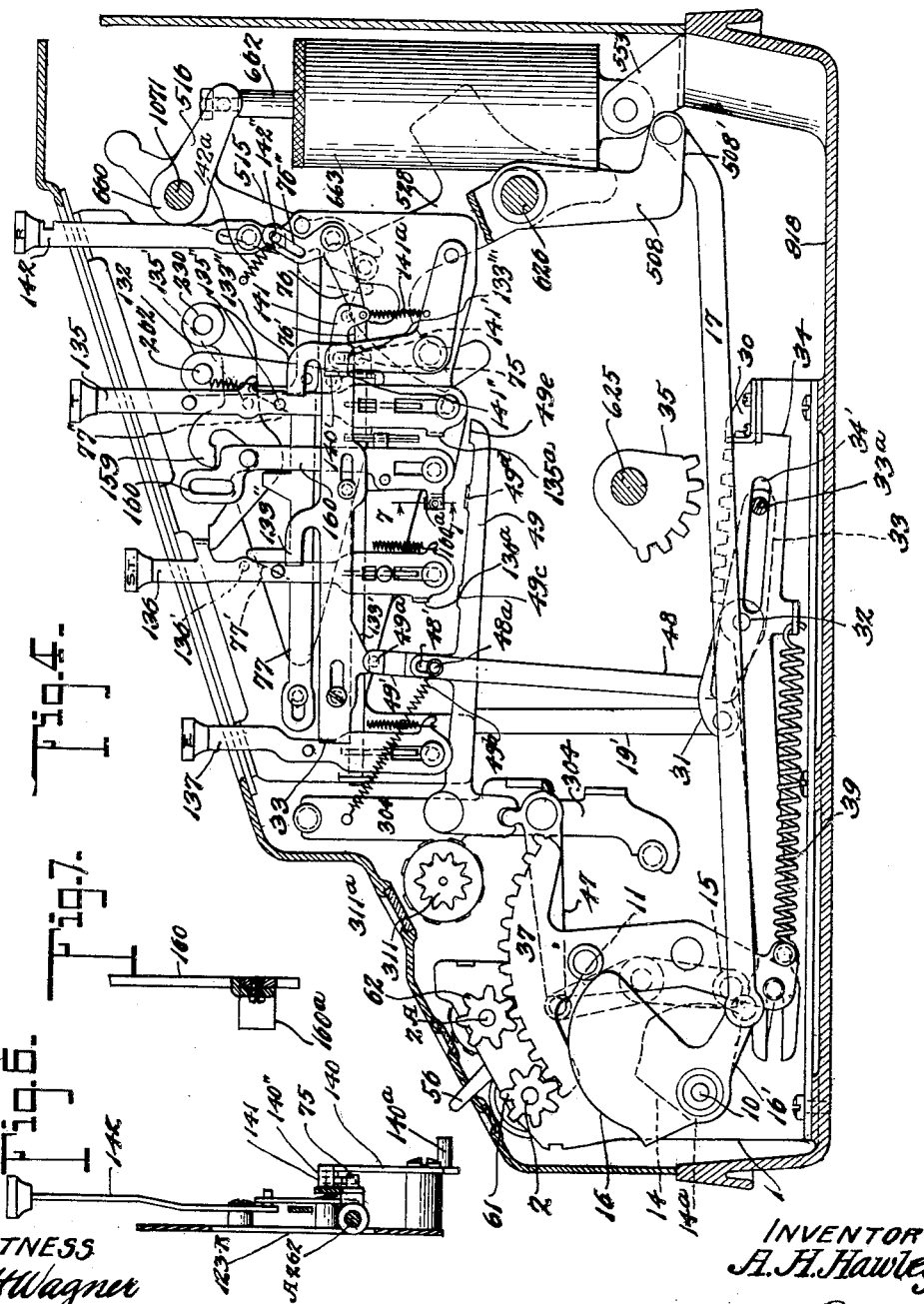
WITNESS
EHWagner
INVENTOR
A. H. Hawley
ATTORNEY

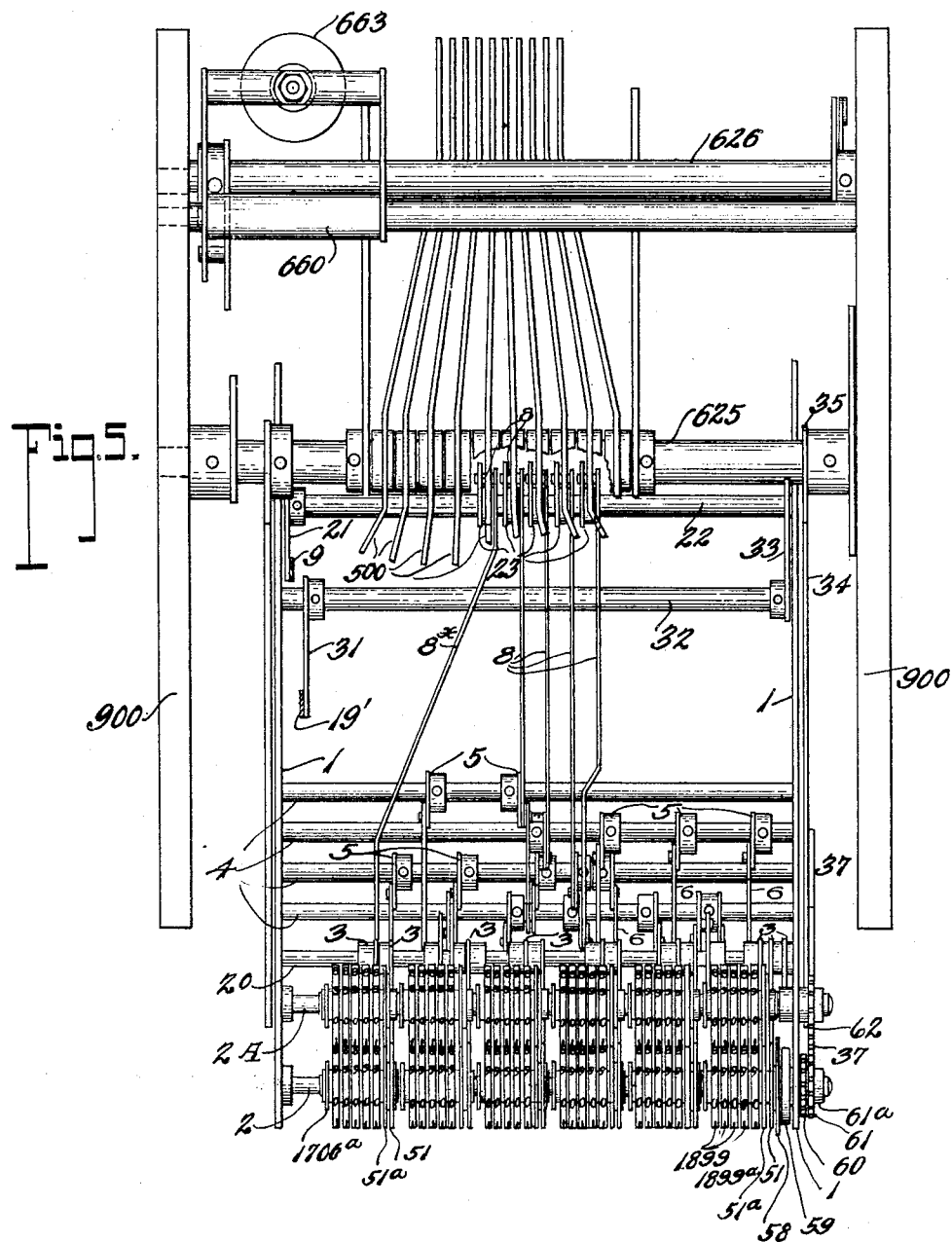

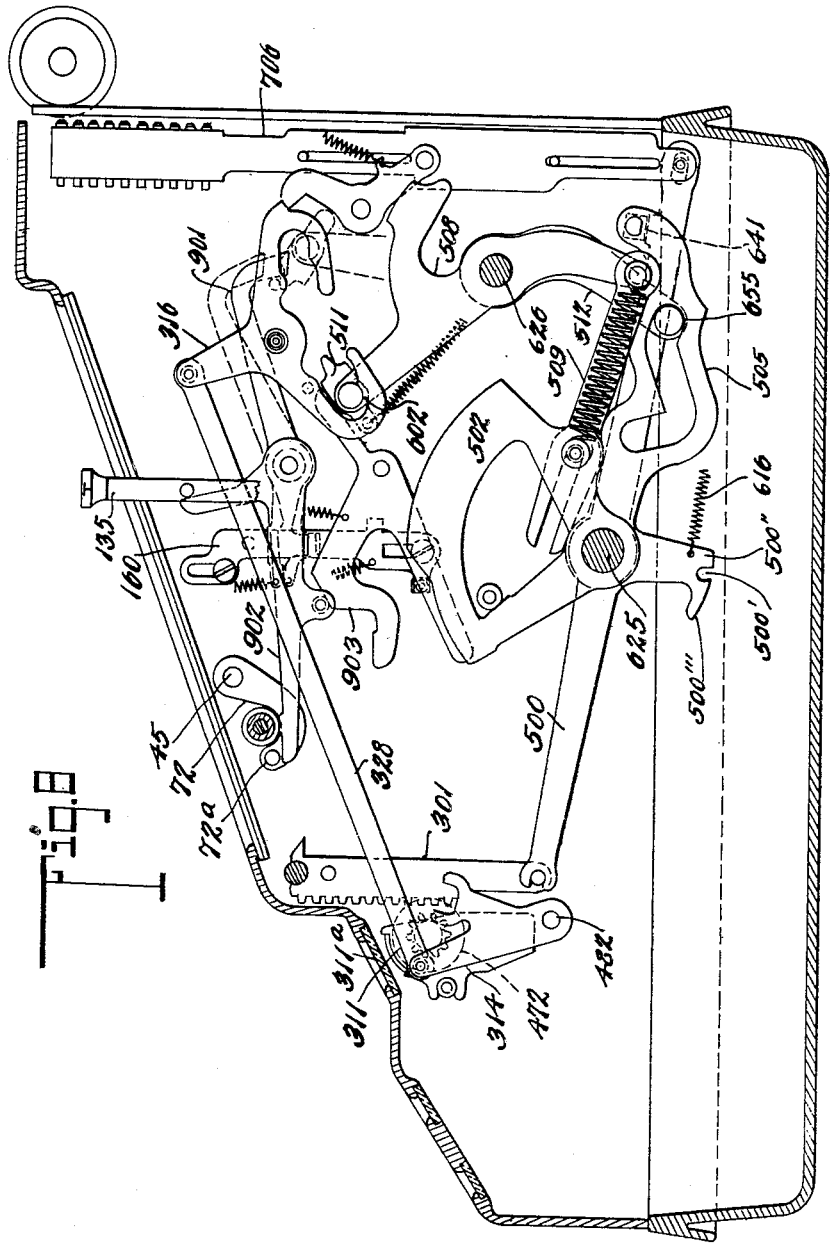

June 4, 1929.   A. H. HAWLEY   1,715,704
ACCOUNTING MACHINE
Original Filed June 9, 1917   13 Sheets-Sheet 7
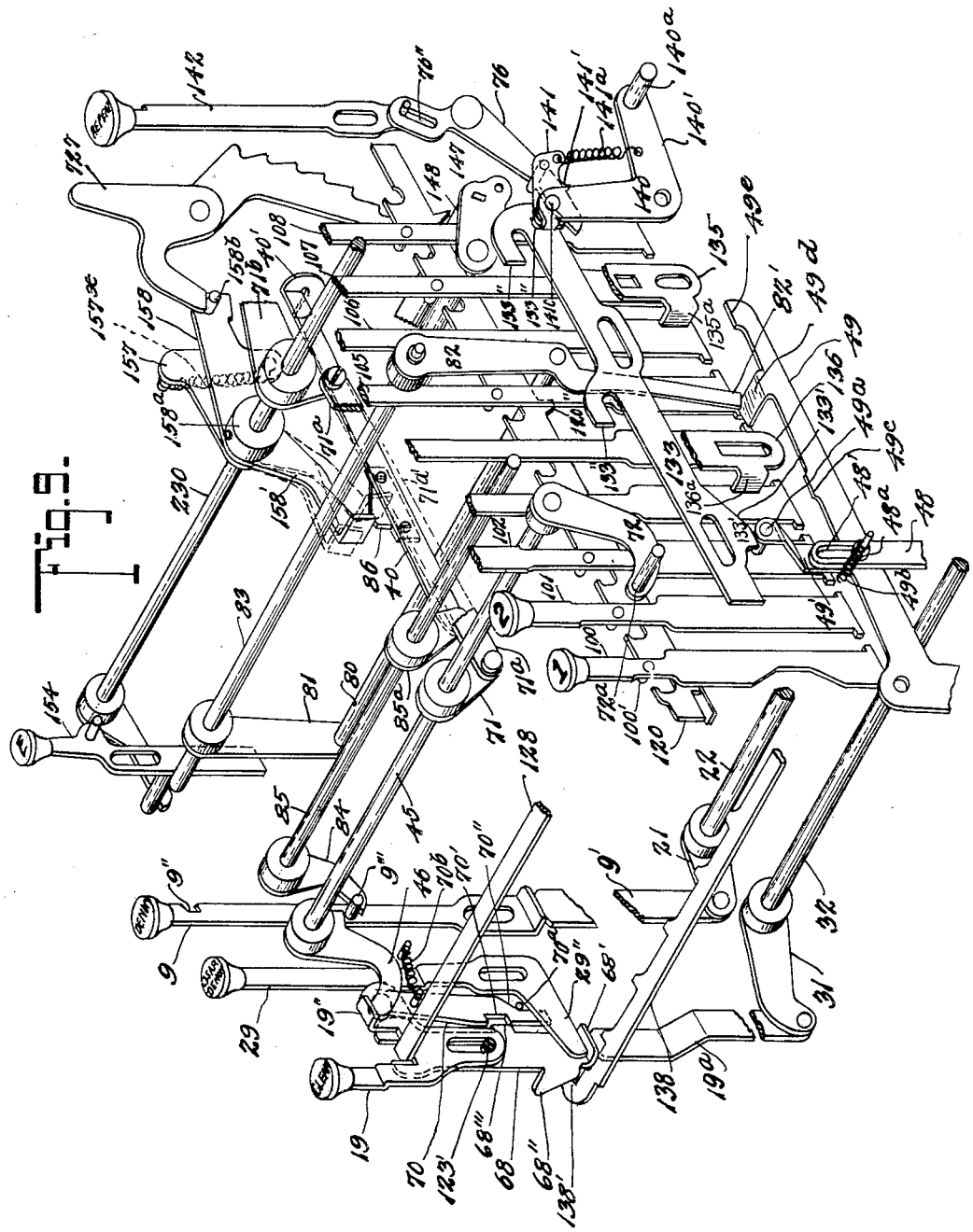
INVENTOR
A. H. Hawley
WITNESS
E. H. Wagner
ATTORNEY

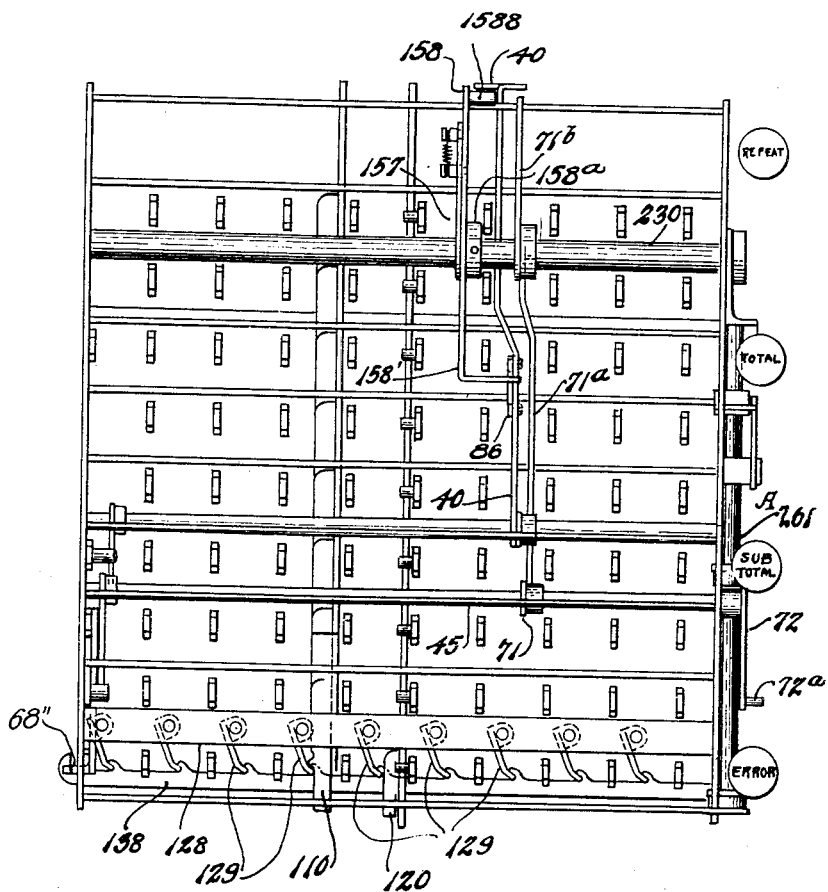

June 4, 1929.  A. H. HAWLEY  1,715,704
ACCOUNTING MACHINE
Original Filed June 9, 1917   13 Sheets-Sheet 9
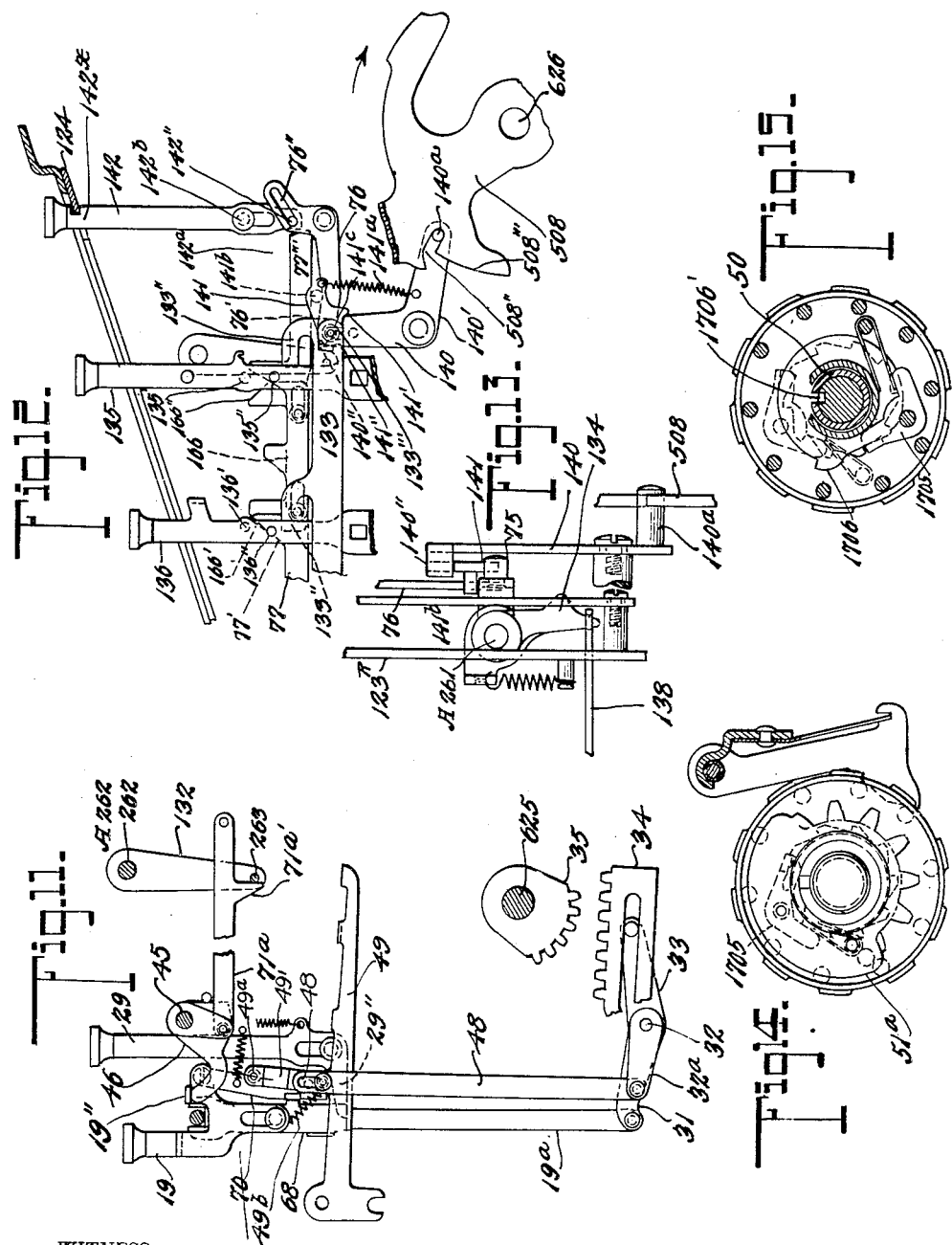
WITNESS:
E.H.Wagner,
INVENTOR.
A.H.Hawley
BY
J.H.Robb
ATTORNEY.

June 4, 1929.  A. H. HAWLEY  1,715,704
ACCOUNTING MACHINE
Original Filed June 9, 1917   13 Sheets-Sheet 10
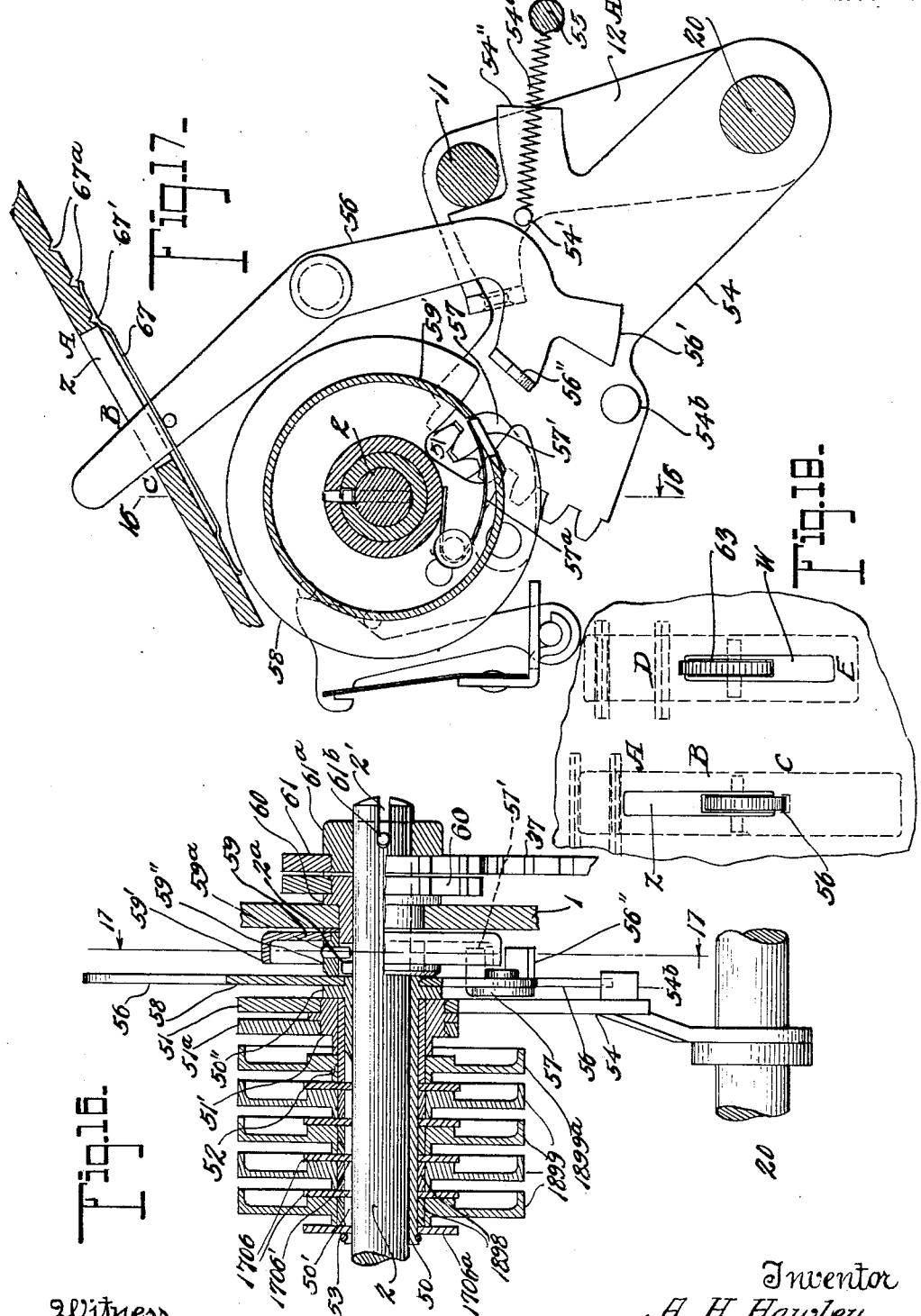

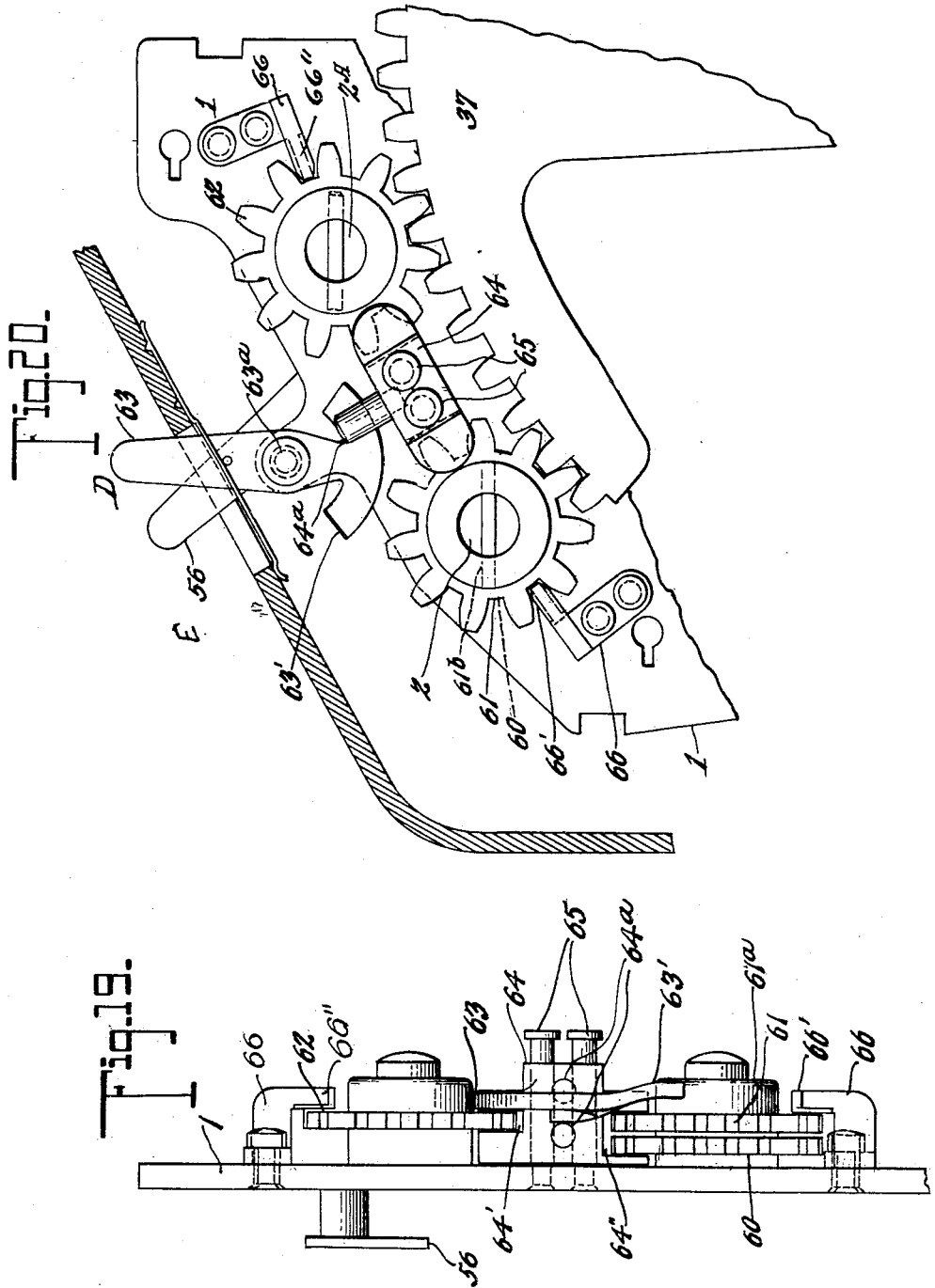

June 4, 1929.   A. H. HAWLEY   1,715,704
ACCOUNTING MACHINE
Original Filed June 9, 1917   13 Sheets-Sheet 12
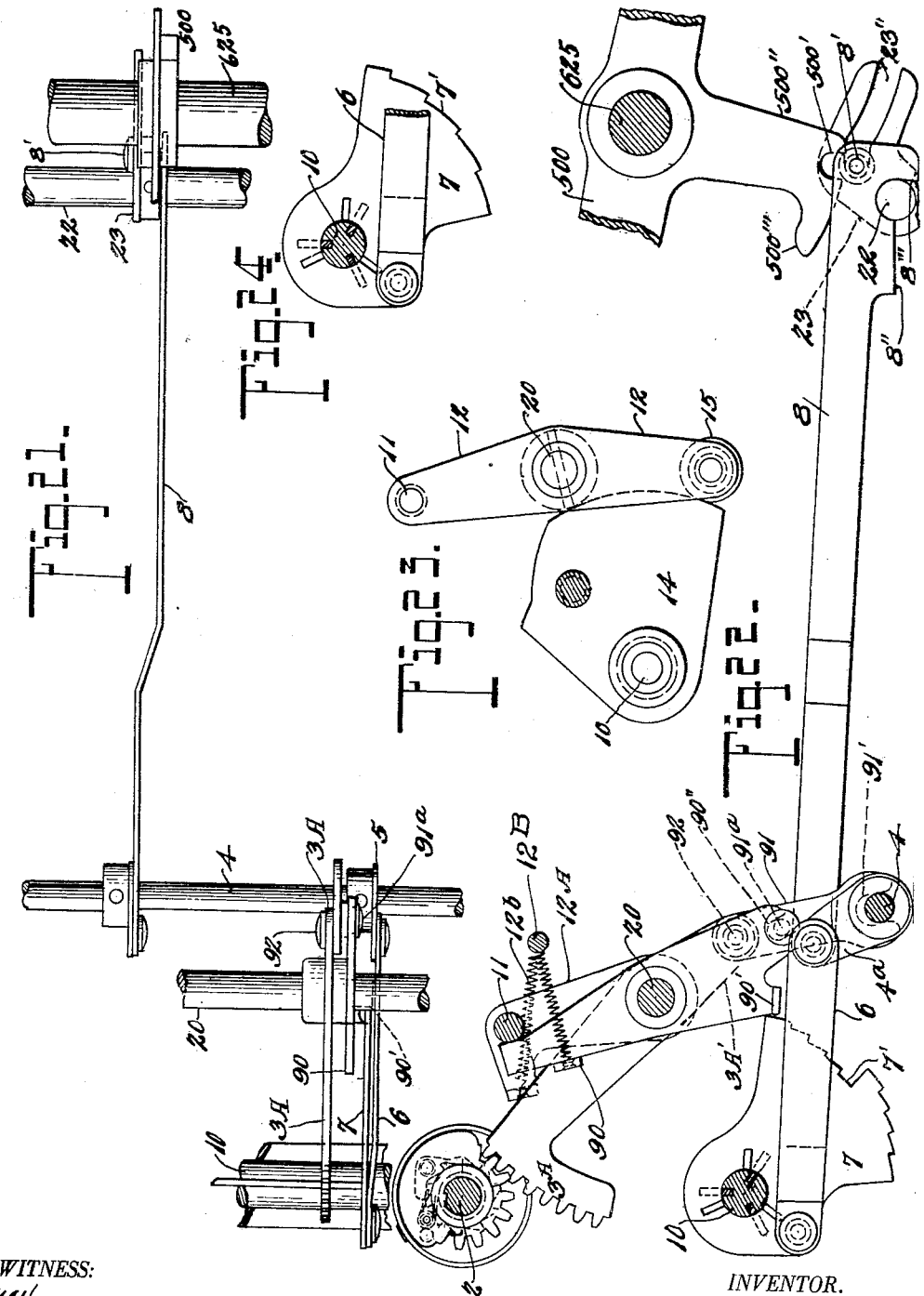

June 4, 1929.

A. H. HAWLEY 1,715,704

ACCOUNTING MACHINE

Original Filed June 9, 1917    13 Sheets-Sheet 13

Inventor
A. H. Hawley

By  A. A. Dicke
    C. H. Killian

Attorney

Patented June 4, 1929.

1,715,704

UNITED STATES PATENT OFFICE.

AMOS H. HAWLEY, OF NEW YORK, N. Y., ASSIGNOR, BY MESNE ASSIGNMENTS, TO REMINGTON ARMS COMPANY, INC., OF NEW YORK, N. Y., A CORPORATION OF DELAWARE.

ACCOUNTING MACHINE.

Application filed June 9, 1917, Serial No. 173,790. Renewed July 20, 1925.

The present invention embodies various improvements in accounting or calculating machines, and among the many objects of the invention are the following:

First, the provision of novel means for counting the number of operations of an accounting machine, said means being preferably of the type known as item counters, so associated with the general operating mechanism of the accounting machine as to count each effective accounting transaction of the machine.

Second, the application of said novel item counting means to an accounting machine of the type set forth in the co-opending application of Mann and Hawley, Serial Number 48,544, filed September 1, 1915, now patent numbered 1,298,751 in which there are organized for cooperative functioning registering, listing, and denominationalizing mechanisms with controlling instrumentalities whereby one or more of said mechanisms may be adjusted to remain inactive, so that the scope of operation and utility of the machine may be increased or decreased dependent upon the particular work required to be done. The novel item counting or registering means previously referred to is peculiarly combined in this invention with the so-called denominationalizing or unit division registers in a very advantageous manner, and special means have been devised and form features of the present improvements whereby any one or two of the mechanisms including the item register, the denominationalizing registers, and the amount accumulating registers, may be cleared singly or simultaneously, respectively.

Third, the provision, as affecting the machine of the Mann and Hawley application aforesaid, of improved denominational registering mechanism in which actuating members of a special construction are employed in order that the unit wheel of certain registers may be advanced an increased number of increments of movement so as to make possible the reduction of the number of such registers to the minimum of one register for each denomination or unit factor, this being conducive to compactness or economy of space, reduction of number of parts, and other obvious advantages.

Fourth, the provision of intermediate devices between the clearing means for the denominationalizing registers and the item counting register whereby said clearing means may be utilized effectively for clearing both of the classes of registers referred to, suitable control devices being utilized to enable single or simultaneous clearing actions of the item counting and denominationalizing registers.

Fifth, the reorganization of certain features of the general machine or individual mechanisms thereof, of the type referred to, whereby to employ positive means for effecting release action of the amount keys and associated indexing parts; to obtain certain novel interlocking instrumentalities between the total and sub-total keys acting to prevent improper operation of the latter; the provision of improved repeat operation controlling means for governing the accounting transactions of the machine; and the employment of improved devices controlling the characterization of items printed in the operation of listing accumulated, denominationalized, eliminated or other items of amounts of transactions handled in the machine.

The invention also resides in divers features of construction and combination of parts as will be obvious from the following description, reference being had to the accompanying drawings wherein:—

Figure 2 is a right vertical sectional view, taken about on the line 2—2 of Figure 1, and showing the general arrangement of the keyboard, accumulating, demoninationalizing and printing mechanisms.

Figure 3 is a vertical sectional view showing more clearly the connecting members intermediate the main actuator and denomination and item registers, and members associated with the characterizing of non-added and denominationalized items.

Figure 4 is a vertical sectional view taken just to the right of the right hand side frame of the denominationalizer section and showing the governor control, and clearing connections for denomination and item registers.

Figure 5 is a view looking down upon the denominationalizing and item counting mechanism and bringing out clearly the connections intermediate the same and the differentially operating levers, certain parts being omitted for the sake of clearness.

Figure 6 is a sectional detail showing parts associated with the repeat key restoring devices.

Figure 7 is a sectional view of the lower end of the elimination bar 160, taken about on the line 7—7 of Figure 4.

Figure 8 is a vertical sectional view showing the accumulator shifting devices.

Figure 9 is a right front isometrical view of keyboard parts showing more clearly the special key connections and character type bar positioning members.

Figure 10 is a plan view showing particularly the keyboard section alone and the locking devices for the keys, certain parts being omitted for clearness.

Figure 11 is a view of the special keys for clearing all registers simultaneously and the denomination register alone, the inter-related parts being clearly shown.

Figure 12 is a view of the special keys on the right hand side of the keyboard and shows, particularly, the means for restoring the repeat key by manipulation of other special keys and the means for positively actuating the key releasing devices.

Figure 13 is a sectional detail showing certain members of the key releasing devices.

Figures 14 and 15 are detail views of the denominationalizing registers showing more clearly the actuating means and transfer mechanism associated therewith.

Figure 16 is a longitudinal sectional view of the item register showing actuating instrumentalities associated therewith. This view is taken on the line 16—16 of Figure 17.

Figure 17 is a sectional side elevational view of the item register, taken on the line 17—17 of Figure 16, and showing more clearly the associated actuating sector and the devices for preventing the clearing of said item register when clearing the denomination registers.

Figure 18 is a sectional detail showing the openings through the machine case to accommodate the denominational and item register control levers and in dotted lines the spring covers provided for said openings. This view also shows indicia corresponding with different positions of the said control levers.

Figures 19 and 20 are views of the denominalizer clearing devices and show more clearly means whereby the item register may be cleared alone.

Figures 21 and 22 are top plan and right elevational views, respectively, showing particularly devices associated with certain denomination registers, viz, pennies and twenties, whereon one, two, three or four units must sometimes be registered.

Figure 23 is an elevational detail of the denomination register operating cam and bail and Figure 24 illustrates the twenty dollar selector member.

General construction.

The machine as shown generally in Figures 1 to 7 inclusive embodies adding, listing and denominationalizing mechanisms similar to those of the Mann and Hawley application previously identified, the adding and listing instrumentalities being generally equivalent to those shown and described in U. S. Letters Patent of Nelson White No. 1,192,721 issued July 25, 1916 and Gustaf Runquist No. 1,213,268 issued January 23, 1917, for which reason the known constructions and actions of parts as disclosed by said patents are not set forth other than generally in this specification. The machine includes a main actuator in the form of the handle 501, or a motor drive may be used as common today, and the usual keyboard including rows of amount keys 100 with associated special operation keys. There is also employed the listing mechanism including type carriers and associated parts together with a paper carriage. The adding is done on the usual amount register or accumulator and a series of denomination registers coact to divide amounts accumulated into units of monetary denominations making up said amounts. The item register is more or less intimately associated with the denomination registers, as will be more fully presented hereinafter.

Figure 1:
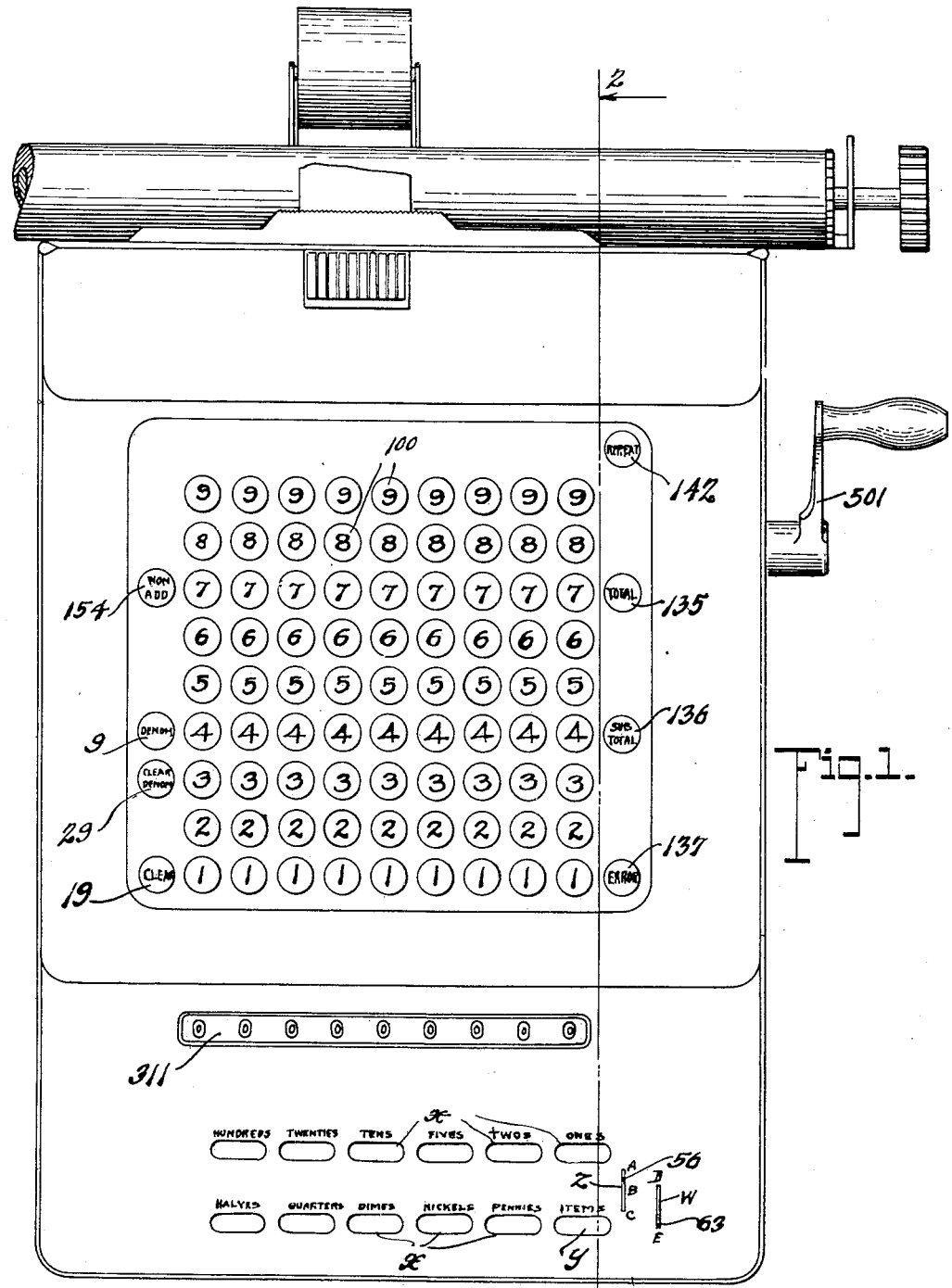
Figure 1 is a top plan view showing, in a general manner, a calculating machine, of the International adding and listing type, embodying the present invention.
Figure 25:
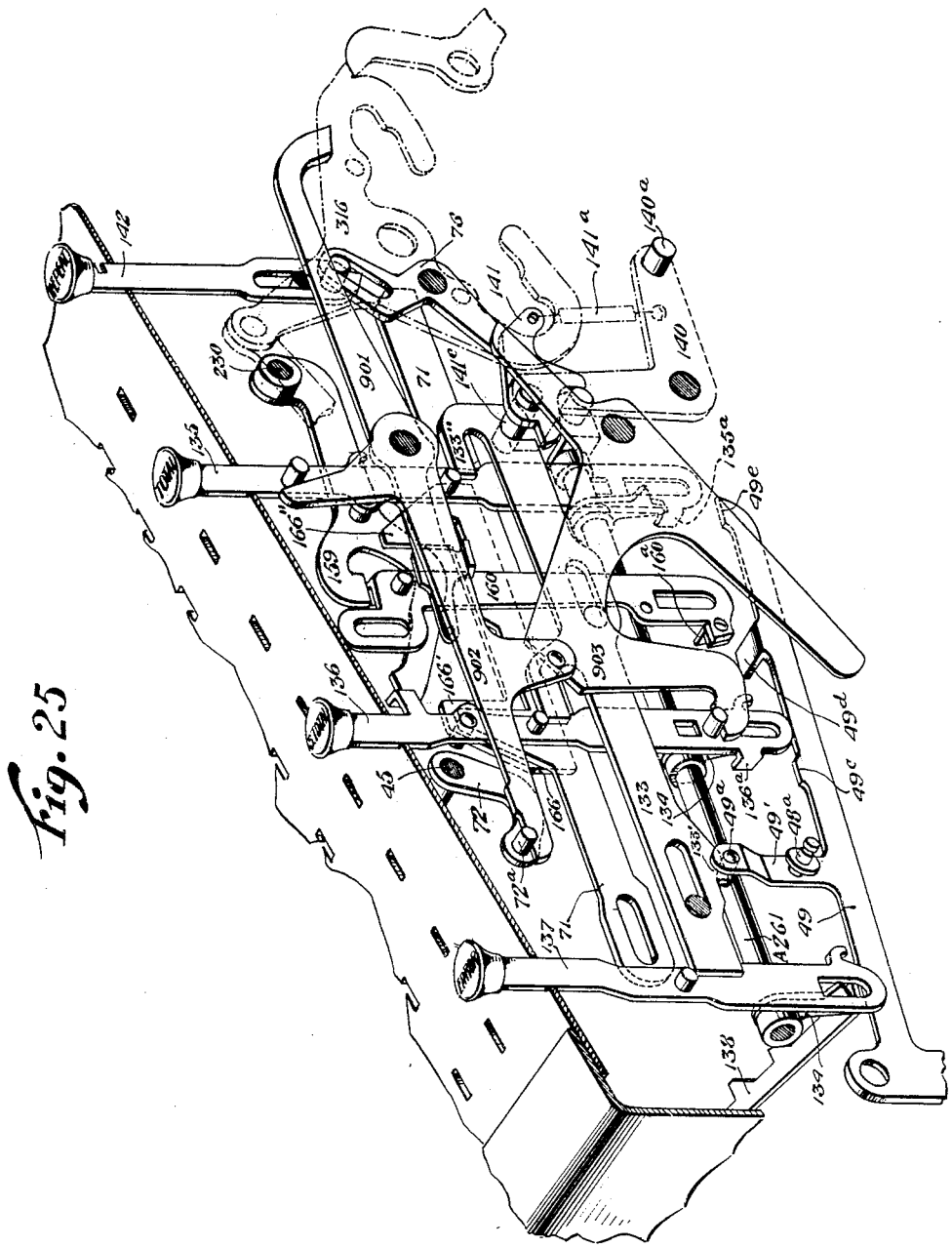
Figure 25 is a diagrammatic view of certain controlling mechanisms.

The accumulator 311 is located at the front of the machine so that registrations thereof may be observed through suitable openings $311^a$ in the machine case. The keys 100 control the indexing mechanism for the accumulating and printing instrumentalities, in a manner substantially as set forth in the aforesaid White patent. There may be provided, as shown in Figures 1 and 25, certain special operation keys including a repeat key, designated 142, an error key designated 137, a subtotal key, designated 136, a total key, designated 135, a non-add key, designated 154, a schedule or denominationalizing key, designated 9, a clear key, designated 19, and a denominationalizer clear key, designated 29.

As seen best in Figures 2 and 8, the accumulator embodies the usual adding wheels 472, the pinions of which are engageable by adding racks 301, the movement of the latter being effected by operating levers 500 connected at their front ends with the adding racks, one for each rack, and at their rear ends each connected with a type carrier 706. A spring 616 is connected with an arm 500″ projecting downwards from the central portion of each lever 500 and normally tends to draw the front end of the lever downwards and raise its rear end. Such movement of the lever 500 is restrained, however, by a general restoring bar 641 contacting with the upper edge of the rear portions of the several levers and carried by a pair of arms 505 having crooked slots formed therein.

The racks 301 and type carriers 706 are adapted for differential movement under the control of the indexing mechanism, directly actuated by the keys 100. It may be noted that on each actuation of the handle 501 correspondingly turning the shaft 625, a cam 502 on said shaft is moved and through the flexible connection 509 (Figures 3 and 8) between said cam and the lever 508, the governor shaft 626, to which said lever 508 is secured, will be partially rotated. Affixed to the governor shaft 626 is a pair of downwardly extending arms 512 provided with studs 655, which enter the crooked slots in the arms 505. Thus the operative connection established by the parts just mentioned is adapted to raise the detent bar 641 to release the levers 500 and permit these levers to move in the event that they have been released by certain cooperative keys 100 and indexing members associated therewith.

The degree of movement of the levers 500 is controlled by the keyboard mechanism including the keys 100 and suitable indexing stops 110, (see Figure 2), one of which is provided for each key 100, those for each row of keys being superposed. Depression of a key 100 of a certain row forces rearwardly by means of a pin 100' the locking bar 120, disengages the front end of said bar from a projection 301' on the corresponding rack 301 and simultaneously projects forward an indexing stop 110 into the path of said projection 301'. According to whichever stop 110 is rendered operative, so will be the degree of movement of the adding rack 301 and lever 500 controlled by said stop. In this way, differential movement of each lever 500 is controlled so as to cause one or more increments of movement of the adding pinion of the associated adding wheel and corresponding movement of the type carrier to position a type of the latter at the printing point.

The upper end of the lever 508, previously noted, carries a stud 602 and a wipe pawl 511, which are adapted to be shifted into special cooperative engagements with the three armed lever 316, (Fig. 25) whereby the latter lever is caused to move the adding pinions of the accumulator 311 into and out of engagement with respect to the adding racks 301. For this purpose the link 328 connects the three armed lever 316 with an arm 314 of the shaft 482 on which the accumulator frame is mounted; and thus the accumulator is shiftable by this means, as customary, to engage its adding pinions at proper times with the racks 301.

Engagement of the wipe pawl with the three armed lever 316 is differentially controlled by a main total lever 902, an auxiliary total lever 901, and a sub-total lever 903, which are adjusted for controlling said engagement by manipulation of certain special operation keys including the total, sub-total, non-add, and clear keys. It is not believed necessary to present with detail the operation of the said levers to control engagement of the wipe pawl 511 with the three armed lever 316 and the consequent shifting of the accumulator into or out of engagement with the adding racks. It suffices to say that in the adding, totaling or sub-totaling operations the co-operation of the adding wheels and adding racks is as customary in this class of machine and as present in the identified White patent.

It will be observed that the listing mechanism is of the known type presented in the White Letters Patent and comprising a series of vertically moving type carriers pivoted at their lower ends to the levers 500 and carrying type spaced to correspond with the predetermined degrees of movement of the levers 500. Printing impression is produced by impingement of the hammers 700 against such type as may be positioned at the printing line.

*Denominationalizing mechanism.*

Referring to the drawings, it will be noticed that the denominational registering mechanism is very similar to that shown and described in the Mann and Hawley application previously referred to, but as there are certain variations it is deemed best to describe said mechanism somewhat in detail.

As best shown in Figures 1, 2, 3 and 4, the denominationalizing and item counting mechanisms are located in a forward extension of the casing enclosing the mechanism of the accounting machine, the registers themselves being in advance of the accumulator or amount register 311.

There are provided eleven of the denominational registers X and one register Y for item counting, said registers being arranged in two rows of six each, with the item register placed at the right hand end of the lower row. Suitable sight openings in the case are provided through which the registrations may be observed and adjacent to each denominational register opening, is indicated the monetary denomination of the associated register, the item register being indicated by the word "Items" adjacent to the corresponding opening. The denominational registers are operated to indicate the units of different monetary denominations in common circulation which are required to make up the amounts charged into the machine. In other words, the amounts charged into the machine are each analyzed into the different monetary units or denominations necessary to make up the same, and the number of the different monetary units indicated by the denomination registers.

Each denominational register consists preferably of four registering wheels of units, tens, hundreds and thousands orders, as usual in registers of this sort. The item register preferably consists of five registering wheels in order that the capacity may be ample for large payrolls or long lists of transactions. Obviously the number of registering wheels in the denominational or item registers may be varied to suit particular requirements and while the present construction of the denominational registering mechanism is arranged to register the number of monetary units or pieces of money composing an amount, the said registers may be arranged to register the components of amounts, or values in dollars and cents.

There is provided a conventional transfer mechanism intermediate the wheels of each register X and Y, as is shown in Figures 14 and 15. While the present machine is a structure representing cooperative denominationizing, registering, listing, accumulating and item counting instrumentalities, it is within the purview of the invention to entirely dispense with the listing mechanism, the amount accumulator or the denominationalizer, or any two of them.

The registers X and Y are supported by shafts 2 and 2A mounted in a frame consisting of the side plates 1 (see Figures 2 and 4). One register is provided for each denomination of money in ordinary circulation and one unit at a time is registered on the five cent, twenty-five cent, fifty cent, one dollar, five dollar and ten dollar registers; one or two units at a time on the dimes, two dollars, and hundred dollars registers; and one, two, three or four units as required, on the pennies and twenties registers.

Arranged approximately beneath the accumulator are the parallel selector shafts 4, one of which is provided for each numerical order of the keyboard, excepting the hundreds order, or in other words, for each row of keys 100. Through the provision of mechanism intermediate the keys and the denominational registers X, it becomes the function of the shafts 4, and the direct link connection 8ˣ (see Fig. 5) for the hundreds order, to distribute to the proper registers the number of units which are to be accumulated thereon. The particular registers that are to be affected by the operation of a particular selector shaft 4 are, of course, empirically determined. Pinned to the shafts 4 are cranks 5, (see Figures 5 and 22) connected by links 6 with selectors 7, the latter being in the form of sectors, the curved edges of which are notched for the purpose of establishing the desired selective action (see Figures 2 and 22)

It will be remembered that the levers 500, one of which is provided for each order of keys 100, are susceptible of differential movement under control of the indexing members 110 and the corresponding keys 100. It is this differential motion of the levers 500 communicated to the shafts 4, which determines the positioning of the selectors 7 in such a manner that register actuating members cooperative with the selectors are controlled to impart one or more increments of movement to said registers in the denominational selecting action of the machine.

Differential motion is communicated from the arms 500″ of the levers 500 to the shafts 4 through the provision of links 8, one of which is used to connect each arm 500″ with the shaft 4 that corresponds to the numerical order of keys 100 that controls the lever 500 having the particular arm 500″. At one end each link 8 is connected with an arm 4ᵃ fixed to the associated shaft 4, the other end of each link having a stud 8′, which is engageable with a slot 500′ in the cooperating arm 500″ (see Figures 2, 8, 21 and 22). The stud 8′ extends laterally beyond the arm 500″ projecting into the curved slot 23″ in an adjacent arm 23 carried by a shaft 22. The shaft 22 is supplied with the same number of arms 23 as there are links 8 and shafts 4.

Mounted in the keyboard section of the machine is the denominationalizer key 9 (see Figure 9) with its lower end engaging a bar 9′, which is connected at its lower end to an arm 21 extending from the shaft 22 at the left hand end of the same, looking toward the machine from the front. The arm 21 being rigid with the shaft 22 is adapted to be depressed by the denominationalizer key 9, thereby rocking the shaft 22 and lifting correspondingly the various arms 23 and the links 8 to interlock the latter, through the studs 8′, with the arms 500″. The denominationalizer key 9 is provided with a notch 9″ which, when the key is depressed, engages the top plate 124 of the keyboard and serves to hold the said key depressed and consequently to maintain operative connection between the actuating levers 500 and the denominationalizing mechanism, a spring 9ᵃ (see Figure 2) serving to restore the denominationalizer key, when the latter is released, and to cause severance of the described connections established by the depression of said key. From the foregoing it will be observed that normally the denominational selectors are inoperative and that to establish operativeness of the same, denominationalizer key 9 must be depressed.

Referring to Figures 2, 8 and 22, it will be observed that interlocking of the studs 8′ with the arms 500″ will be possible only when the levers 500 are in their normal positions, owing to the formation of the curved tail or projection 500 When the shaft 22 is rocked by depression of key 9, the studs 8′ are raised into the slots 500′ of arms 500″ and the arms 23 are so positioned that their slots 23″ are on an arc with the shaft 625 as a center; thus the studs 8′ are guided in their excursions and held interlocked with the coacting arms 500″.

When the links 8 are lifted, incident to the rocking of the shaft 22 to interlock the studs 8′ and arms 500″, and are carried rearward, the projections 8″ are in close proximity with the shaft 22 to prevent the links being lowered and the operative engagement broken. When the links 8, and associated parts, are at normal, as shown in Figure 22, notches in the said links engage the shaft 22 to prevent unauthorized movement, the rearward wall 8‴ of said notches projecting downward to prevent excessive return or forward movement of the links.

Actuating devices for pennies and twenties denomination registers.

By way of preliminary explanation, it being understood that through the connections previously described it is possible to differentially adjust the various selectors 7 so that selected recesses of the latter may be brought opposite the lower ends of the levers 3. The levers 3 controlling the operation of the various denomination registers are adapted to at the proper time cause accumulation on said registers of the units of denominations into which any amount set up by a transaction of the machine, is to be mechanically divided. The selector members 7 are best shown in the drawings in Figures 2, 22 and 24. The said members 7 are loosely mounted on the shaft 10 and their differential adjustment is effected by the links 6 connecting the selectors with the shafts 4 (see Figure 2). The selector 7 associated with the pennies register has cut-away portions 7′ forming two series of four steps or graduations each, see Figure 22, and the selector associated with the twenty dollar register has one series only comprising four steps as shown in Figure 24. The selector 7 shown in Figure 2 is typical of the form of many others of the selectors used, namely such as have a single step. The notched or cut-away portions of the selectors for the pennies and twenty dollar registers are adapted to receive a projection 90′ on the lower end of the selector lever 90 (see Figure 22) which lever 90 is loosely mounted on the cross shaft 20 and provided with a suitable stop extension for engagement with the bail rod 11. The lower extremity of the lever 90 is bifurcated at 90″ to receive a stud 91ᵃ carried by a lever 91, the upper end of which is pivoted to the arm 3A′ of the lever 3A which is loosely mounted on the shaft 20. The selector lever 91 engages the shaft 4 by means of a bifurcation 91′ in the lower end of said lever.

The above parts acting in the manner now to be described solve the difficult problem of obtaining the requisite number of increments of movement of the pennies and twenty dollar denominationalizing registers by systems of levers organized to occupy only that space available in the particular portion of the machine in which the register actuating devices are arranged.

The shaft 20, see Figure 23, has an arm 12′ extending downwards therefrom and carrying a roller 15 which by the tension of the spring 12ᵇ, one end of which is attached to a projection of the arm 12A, and the other end to a suitable support 12B on the left hand frame plate 1, is kept in engagement with the periphery of a cam 14 mounted on the shaft 10 adjacent to the inner side of the right hand frame plate 1 of the denominationalizer section, see Figure 3. A second cam 16 (see Figure 4) is mounted on the same shaft 10 in spaced relation to the outer side of the said frame plate 1. The two cam members 14 and 16 are rigidly mounted on a hub 14ᵃ which is loose on the shaft 10, and the cam 16 has an arm 16′ connected by means of a link 17 with an arm 508′ affixed to the control or governor shaft 626. Under these conditions, therefore, it is to be noted that on each operation of the main shaft 625 and the governor shaft 626 the cams 14 and 16 are caused to turn. The arrangement of the levers 90 and 91 (see Figure 22) is such, and these levers are so proportioned that when on operation of the machine, the cam 14 presents its low or dwell portion to the roller 15, and the bail rod 11 is carried rearward, the lever 90 follows as permitted by the now adjusted cut-away portion 7′ of the selector 7, causing the lever 91 to pivot on the shaft 4. In this manner the lever 91 will increase in direct proportion, and transmit, increment for increment, the motion so received to the register actuating lever 3A whereby to advance the units wheel of the register accordingly, as illustrated in Figure 22. The extent of the advance of the units wheel will of course depend upon whether the cut-away portion 7′ is of one, two, three or four increment movement depth, so to speak. The members 3A and 91 together form virtually a compound lever having a sort of toggle action.

Item counting register.

As previously noted, the item register is mounted on the forward shaft 2 of the denominationalizer section and at the right hand end of said shaft. It is loosely mounted to be revolvable as an integral structure on and independent of rotary motion of the shaft 2. Referring to Figure 16, 50 is a sleeve on which the item registering wheels 1899 are loosely mounted. A small bushing 1898, the length of which is slightly greater than the thickness of the hub of a wheel 1899, is provided intermediate the sleeve 50 and each wheel 1899. The bushings 1898 are separated from each other by cam members 1706, the function of which appertains to the transfer and zero setting devices, obvious by reference to Figure 15. The bushing 52 on which the right hand or units register wheel 1899$^a$ revolves, also carries a gear sector 51 and plate 51$^a$ mounted rigidly on a hub 51'; the plate 51$^a$ carries a pawl 1705 (see Figure 14) which engages ratchet teeth of the units wheel 1899$^a$, to cause step by step motion of the latter, as is usual in such devices. The cams 1706 have key projections 1706', which enter a longitudinal slot 50' in the sleeve 50 and lock the said cams 1706 on the sleeve 50. The several bushings 52, and 1898, and the cams 1706, are held longitudinally on the sleeve by being lightly clamped between a flange 50'' formed on the sleeve 50 and a disk 1706$^a$, by means of a circular spring 53 binding in an annular groove near the left hand end of the sleeve 50. It is to be observed that the key projections 1706' do not engage the shaft 2 as is the case in the denominational registers, therefore, the sleeve with the parts mounted thereon is adapted to be revolved independent of the shaft 2 and the said shaft may be revolved without effecting movement of the sleeve and associated parts. This independence of movement is necessary in order that either the denominationalizer or the item register may be cleared without affecting the other.

On the shaft 20, on which the denominational register actuating levers 3, 3A, and 90 are mounted, is also loosely mounted the sector 54 (see Figures 2, 16 and 17), which by means of suitable gear teeth engages the sector 51 to actuate the latter. The sector 54 and levers 3, 3A and 90 are held in normal position, by means of the bail formed of the arms 12 and 12A, rigid on the shaft 20 and a cross rod 11, previously noted, connecting said arms and abutting with the rear edges of said levers 3, 3A, and 90 and sector 54.

The sector 54 is initially operated, by means of a spring 54$^a$ attached to a stud 54' and a stationary support 55, as shown in Figure 17, when the rod 11 is moved rearwardly by operation of the bail arms 12 and 12A, said initial movement being terminated by engagement of the projection 54'' with the spring support 55. The initial movement of the sector 54 is always rearward and of a degree corresponding to one increment of movement of the associated sector 51 to cause the registration of one unit on the units wheel of the item register. It is the subsequent or return movement of the bail 11 bringing the sector 54 to its normal position that causes the registering action of the register, this being due to the pawl and ratchet connection between the plate 51$^a$ and the adjacent units wheel.

In some uses to which the machine is adaptable, it may be desired to prevent the counting of certain items, therefore, a stud 54$^b$ is provided on the sector 54 to be engaged by a projection 56' of a lever 56 when the latter is swung to a corresponding position as will be pointed out.

The lever 56 is a manual controlling device or member and is pivotally mounted in spaced relation to the inside of the frame plate 1. It extends upward and forward through a suitable opening Z in the machine casing (see Figure 1, 17 and 18), and is adaptable to manipulation for varied adjustments which may be indicated in any suitable manner, such for instance, as shown in Figure 17, wherein A indicates the position to which the said lever 56 must be adjusted to prevent the clearing of the item register when the denominational registers are being cleared; B indicates the position of adjustment of the lever to prevent the counting of items as previously mentioned, and C indicates the position of adjustment of the lever when it is desired to clear the item register simultaneously with the other registers.

The lever 54 is somewhat like the adjacent coaxial levers 3 and 3$^a$ on shaft 20, the latter levers of course operating the various denominationalizing registers X on the shafts 2 and 2A. The rear edges of the levers 54, 3 and 3A, are aligned and the rod 11 of the bail 12 holds the said levers normally against rearward movement as previously suggested. When, however, said bail is rocked rearwards by the pull of the spring 12$^b$ (see Figures 22 and 23) acting when the cam 14 is turned sufficiently, the various levers 3, 3A, may rock rearwards at their upper ends if the selectors 7 permit, and likewise the lever 54 if the control means 56 etc. for the same permit. In their rearward rocking the levers 3, 3A, and 54 do not actuate the registers X and Y, the gear sectors 51 turning loosely, but the return movement of the sectors drives the registers through the pawl and ratchet connections between the parts 51 and the units wheels. Of course if the selectors 7 or any of them, when adjusted do not present any stepped or cut-away portions to the projections at the lower ends of the levers 3 and 3A, no actuation of corresponding registers can take place.

Obviously, since the cam 14 is controlled in its movement by the governor 663 connected to the shaft 626, through the connections previously set forth, the operation of the item counter is also under the control of the governor. This result is obtained owing to the fact that the bail rod 11 moves under the controlling influence of the cam 14, said rod acting in turn to govern the item registry operating movement of the sector 54, as hereinbefore presented.

Item register clearing mechanism.

The lower portion of the lever 56 carries a projection 56″ provided to engage a pawl 57 carried by a disk 58, which is rigidly mounted on the sleeve 50. The pawl 57 is adapted by means of a projection 57′ to engage in a slot in a flange 59′ of the disk 59 (see Figures 16 and 17). The disk 59 is rigidly fixed on a hub 59″ mounted on a sleeve extension of a second hub 60′. The sleeve extension of the hub 60′ has a slot milled in its end which receives the pin 59$^a$ driven in the wall of the hub 59″ in such a way as to maintain a fixed relation between the two hubs 59″ and 60′ against relative rotation, but permitting longitudinal movement of the hub 60′ on the shaft 2 which carries it.

A pin 2$^a$ projecting radially from the shaft 2 also enters the slot in the end of the sleeve extension of the hub 60′. On the hub 60′ is rigidly mounted a pinion 60 adapted to be shifted into engagement with the clearing sector 37 as will appear hereinafter. A second pinion 61 is slidably mounted adjacent the pinion 60 on the end of the shaft 2, by means of the pin 61$^b$, which passes through the hub 61$^a$ and engages a slot milled in the end of the shaft 2. The pinion 61 is thus fixed to rotate with said shaft 2, (see Figure 16).

It is to be borne in mind that the denominational registers are cleared by revolving the shafts 2 and 2A, on which they are mounted, in a clockwise direction looking toward the machine from the right (see Figure 4) and that revolving motion of said shafts is accomplished by means of a clearing sector 37 which is adapted, by flexible means consisting of the rack member 34 and spring 39, for operative connection with the main actuator shaft 625.

For purposes of the present invention, the clearing sector 37 is utilized for clearing the item register either simultaneously with or independently of the clearing of the denominational registers, and thus for obvious reasons the pinions 61 and 62 are arranged to be shiftable on their shafts 2 and 2A, respectively. When adjusted to clear the denomination registers the pinions 61 and 62 are in engagement with the clearing sector 37 and when adjusted to clear the item register independently of the denomination registers, the pinions 61 and 62 are shifted out of engagement with the sector 37 and the pinion 60 is shifted and engaged with the said sector 37.

Reference is now made to Figures 18, 19 and 20 wherein are shown the devices for shifting the pinions 60, 61 and 62 into and out of engagement with the clearing sector 37. A manipulative controlling lever 63 projects upward through an opening W in the machine casing. It is pivoted at 63$^a$ to the frame plate 1 and at its lower end is formed to provide a lateral thrust cam 63′ which engages projecting pins 64$^a$ of a sliding block 64. The sliding block 64 is mounted to slide on pins 65, projecting outward from the frame plate 1, and is slotted at 64′ and 64″ (see Figure 19) to straddle the pinions 60, 61 and 62, the slot 64′ being of a width to receive one pinion, viz 62, and the slot 64″ being of a width to receive the other two, viz 60 and 61. Obviously manipulation of the lever 63 will through the means just described, shift the pinions longitudinally of the shafts on which they are mounted and relative to the sector 37 so that when the lever 63 is in position D (see Figure 18) and as shown in Figure 20, the pinions 61 and 62 will be in engagement with the sector 37 and when said lever 63 is in position E the pinions 61 and 62 will be disengaged and the pinion 60 engaged relative to the sector 37.

In respect to the denominationalizing mechanism as heretofore proposed, the sector 37 was relied on through engagement with the clearing pinions 61 and 62 to hold the shafts 2 and 2A stationary when amounts are being denominationalized. Obviously it is also necessary to hold these shafts 2 and 2A stationary when clearing the item register alone, or in other words, at all times except when it is desired to clear the denominational registers. Therefore, the brackets 66 are provided rigidly mounted on the frame plate 1, in juxtaposition with the pinions 61 and 62, and each has a projection 66′ adapted to engage in a tooth-space of the pinions 61 and 62 when the latter are shifted rightward and out of engagement with the sector 37. Thus the shafts 2 and 2A are held against rotation, when the pinion 60 is engaged with the sector 37 for clearing of the item register alone.

It will be remembered that the slot in the end of the sleeve extension of the hub 60′ on which the pinion 60 is mounted, normally engages both of the pins 2$^a$ and 59$^a$ thereby locking the pinion 60 and the disk 59 to the shaft 2; however, when the pinion 60 is shifted to engage with the sector 37, the end of the sleeve extension of the hub 60′ is moved out of engagement with the pin 2$^a$ but remains engaged with the pin 59$^a$.

It is believed obvious from the foregoing that operation of the sector 37, when the lever 63 is in position indicated by E (see Figure 18) will revolve the pinion 60 and disk 59 and because of the connection established by the pawl 57, between said disk 59 and the disk 58, which carries the pawl 57; the sleeve 50 and co-acting zero setting devices will be turned to carry the wheels 1899 and 1899$^a$ to zero or clear position.

In further reference to the lever 56 (see Figures 16 and 17) it may be observed that when said lever 56 is shifted to position B, (see Figure 18) its projection 56′ will be presented in the path of the projection 54$^b$ of the sector 54 and the latter will be locked against operation and obviously the counting of items prevented.

When shifted to position A, the lever 56 will by its projection 56", press the pawl 57 against its restoring spring 57$^a$ and disengage the projection 57' of the said pawl 57 in relation to the slot in the flange 59' of the disk 59. The projection 56" is adapted to pass through the slot in the flange 59' of the disk 59, when the latter is at normal, to a position inside the said flange; therefore, when the disk 59 is turned from normal position with the lever 56 thus positioned, the said lever is locked against manipulation.

It will be observed that the adjustment just described severs the connection between the clearing drive members and the register proper, consequently the denominationalizer may be cleared without affecting the item register, and that if the lever 56 is thus adjusted (to its position A), and the lever 63 adjusted to position E, no clearing of either the item or denominational registers will be effected by operation of the sector 37. This last mentioned combined adjustment is not designed to permit clearing the amount accumulator without affecting the other registers as such a result is accomplished by the total key 135 and associated parts in the ordinary way as explained in the White patent aforesaid.

Each lever 56 and 63 is provided with a spring plate 67 which being slotted to fit over and adapted to be shifted with said lever serves to close the corresponding opening in the machine casing. The spring plate 67 is also provided with a projection 67' which is adapted to engage notches in the inside of the machine casing and thus hold the levers in position as adjusted.

*Special clearing devices.*

In the machine relative to which the present improvements constitute additions and reorganizations of cooperating devices, it is impossible to clear the denominationalizer without clearing the accumulator 311; therefore, since the denominationalizer clearing devices are now made use of to clear the item counter and to additionally provide means for independent clearing of the denominationalizer, a special key 29 (see Figures 1 and 9) is mounted in the keyboard at the left hand side of the same and has an extension 29" (see Figure 9) which engages a projection 68' of a vertical sliding member 68 mounted on the left hand side plate (not shown) of the keyboard (see Figures 9 and 11). The sliding member 68 is provided with a cam projection 68", which is adapted to engage the member 138. (see Figures 9 and 10) to actuate the latter for swinging the shutters 129 to release such index stops 110 as may be in their forward position and thereby restore depressed amount keys 100.

The pin 123' is rigid in the keyboard side plate and forms a guide for the slide member 68 and the clearing key 19.

Manipulation of the special key 29 to depress the same will move the member 68 downward engaging the bar 19$^a$ which is connected to an arm 31 affixed to a transverse shaft 32 (see Figure 11) which also carries near its opposite or right hand end the arms 32$^a$ and 33, the former of which is connected by a link 48 (see Figures 11 and 3) with the lever 49 (Fig. 25) pivoted to a plate 304 of the adding section of the machine. The lever 49 is in engagement with the member 47 which normally is in the path of movement of the bail rod 11. The said lever 49 has an upward projection 49' carrying a stud 49$^a$ adapted for engagement by the cam projection 133' of the slide bar 133, which is connected for reciprocating motion at each operation of the actuator handle 501 (see Figure 3). It will be observed that when the slide bar 133 is moved forward incident to a forward stroke of the main actuator, the lever 49 will be actuated by the spring 49$^b$, attached thereto, to raise and move the arm 47 upwardly out of the path of the rod 11 which will then be free to move rearwardly under the tension of the springs 13 (see Figure 3) and 54$^a$ (see Figure 17), attached to the sector 54, and such levers 3 as may have been selected for operation under control of the denominational selectors will be permitted to operate for denominationalizing purposes.

The clearing key 19 (see Figure 9) is provided with a bent-over projection 19", which engages an arm 46 affixed to the transverse shaft 45 in the keyboard and which carries the arms 71 and 72, the former of which is connected by a link 71$^a$ to a lever 71$^b$ loosely mounted on a second transverse shaft 230. This lever 71$^b$ has to do with the characterization of totals and is not pertinent to the present invention.

The arm 72 is at the extreme right hand end of the shaft 45 and is provided with a stud 72$^a$ (see Figures 8, 9, 10 and 25) which projects laterally over the main total lever 902 and is adapted to engage and cause the latter to be actuated to control adjustment of the accumulator 311 for taking a total and clearing.

Pivotally attached to the rearward projection of the clearing key 19 is a latch pawl 70 provided with a notch 70' adapted to engage an adjacent projection 68''' of the slide bar 68. The latch pawl 70 has a cam edge 70" which rides against the pin 70$^a$ (see Figure 9), projecting laterally from the keyboard side plate, as the said pawl is carried downward with the clearing key 19; the action of the cam edge 70" against the pin 70$^a$ causes the notch 70' to engage the projection 68''' and thus positively connects the key 19 with the slide bar 68 and the key 19 is held depressed until, incident to return of the main actuator to normal, the bar 138 is moved and the projection 68'' released from underneath the latch end 138' of the bar 138. A spring 70ᵇ suitably attached to the latch pawl 70 serves to disengage the latter from the bar 68 when the key 19 is restored as will be obvious by reference to Figure 9.

The link 71ᵃ previously noted as a downward projection 71ᵃ' which engages the rod 263 of the bail A—262 (see Figure 11); the said bail rod 263 is provided to engage suitable projections on the zero stop members 120 to move the latter out of the path of the projections 301' of the adding racks 301; thus it will be seen how the adding racks are released incident to manipulation of the clear key for a general clearing of the machine (see Figure 2).

It may be noted that when a special clear key 19 or 29 is manipulated for a clearing operation the rack 34 (see Figure 4) is thrown into engagement with the sector 35, attached to the main actuator shaft 625, by means of the stud 33ᵃ, carried by the arm 33 attached to the shaft 32, the said stud 33ᵃ being projected through a slot 34' of said rack 34. Then when the shaft 625 is rocked by its handle or motor, the connections 34—39 will operate the clearing sector 37 attached thereto.

The manner in which the denominationalizer, although normally inoperative, is rendered operative, at each operation of the main actuator, has been pointed out; it is to be observed, however, that for certain operations, such as totaling, subtotaling and clearing, the bail 11 must not operate; therefore to prevent such operation the lever 49 is provided with projections 49ᶜ, 49ᵈ and 49ᵉ (see Figures 4 and 25) to be engaged by lateral projections of the keys 135 and 136; thus when the total key 135 is depressed, the projection 135ᵃ will engage the projection 49ᵉ and when the sub-total key 136 is depressed the projection 136ᵃ will engage the projection 49ᶜ and in either case the lever 49 will be held down when the projection 133' is carried forward by movement of the bar 133 and incidentally the operation of the bail 11 to permit denominationalizing will be prevented. When either of the special clear keys 19 or 29 is depressed, the shaft 32 will be rocked, because of connections hereinbefore described, and the upper end of the slot 48' of the bar 48 will be brought into engagement with the stud 48ᵃ rigid on the lever 49 and obviously the said lever will be held and remain down as in the case of operation of the keys 135 and 136.

In the foregoing description it has been shown that, through the devices provided, selective clearing of the different registers may be accomplished. The subjoined tabulation is a summary of the various adjustments and resultant clearings.

| Registers to be cleared | | Manipulative element adjustments | | | | |
|---|---|---|---|---|---|---|
| | | Total key 135 | Clear key 29 | Denominational key 19 | Lever 56 | Lever 63 |
| Singly | Register 311 | Depressed | Normal | Normal | Any | Any |
| | Denominational registers $x$ | Normal | Normal | Depressed | A | D |
| | Item register $y$ | Normal | Normal | Depressed | C | E |
| Two at time | 311 and $x$ | Normal | Depressed | Normal | A | D |
| | 311 and $y$ | Normal | Depressed | Normal | C | E |
| | $x$ and $y$ | Normal | Normal | Depressed | C | D |
| All simultaneously | | Normal | Depressed | Normal | C | D |

*Positively operated key releasing devices.*

It has heretofore been a practice to depend upon a spring actuated pawl carrier as a means of releasing the manipulative keys upon the return of the main actuator to normal (see member 106 of Figure 15 of White patent aforesaid). This construction in practice is not altogether satisfactory in that sometimes the pawl carrier does not respond to the ordinary spring tension, due perhaps to friction on its mounting or the gumming of the lubricant used, or other causes. Therefore, as shown in Figures 3 and 12, I have provided, in the upper arm of the lever 508, a cam slot 508'' adapted to receive the lateral stud 140ᵃ carried by an arm 140' of the lever 140 which is mounted on the keyboard side plate 123—R (see Figures 13 and 25). The engagement of the stud 140ᵃ with the slot 508'' is such that as the lever 508 oscillates with the shaft 626 to which it is fixed, the stud 140ᵃ will initially be carried out of the slot and then remain in engagement with the arc 508''', which forms a dwell. It is to be borne in mind that the initial movement of the main actuator causes movement of the lever 508 in the direction indicated by the arrow (see Figure 12); thus it is plain that upon return movement the stud 140ᵃ will be reengaged with the slot 500'' of the lever 508 and the pawl carrying lever 140 is positively actuated in both directions of its movement. This lever 140 carries certain key release actuating means now to be pointed out and analogous to those now known.

*Repeat key mechanism and devices for locking total and sub-total keys against mis-operation.*

Referring to Figure 12, mounted on the upper end of the lever 140 is the trip pawl 141 provided with a tooth 141' which is adapted to engage the stud 75 associated with the key release shaft A—261 seen in Figures 13 and 25. The pawl 141 has a stop projection 141" which engages the ear 140", formed on the upper end of the lever 140, and serves to hold the said pawl in operative position against the tension of the spring 141$^a$. The function of the repeat key is to disable the pawl 141 and the coacting shaft A—261 as is well known according to the identified White patent; the means adopted for this purpose in the present instance consists of the lever 76 mounted pivotally on the side plate 123—R and, by means of the slot 76" and the stud 142", connected with the repeat key 142. At the front end of the said lever 76 is a surface 76' over which the stud 141$^b$ rides when the repeat key is depressed as shown in Figure 12. The up or inoperative position of the key 142 is shown in Figure 4. When in the latter position the key 142 permits the lever 76 to remain lowered or tilted so that the tooth 141' of the pawl 141 may engage the stud 75 of the key release shaft A—261, on the return movement of the shaft 626, thus rocking the shaft A—261 to release the keys after the ordinary manner. The positioning of the parts as in Figure 12 on depression of the key 142 simply renders the part 141' inoperative to perform the stated function.

The devices which lock the total and sub-total keys against mis-operation are best shown in Figures 12 and 25. It will be observed that supported by suitable mountings on the keyboard side plate 123—R, is a slide member 166 with the two beveled projections 166' and 166" arranged for engagement by the studs 136' and 135' projecting laterally from the sub-total and total keys respectively; these members are so proportioned that upon depression of either of the two keys 135 or 136 the member 166 will be moved away from the key depressed and into the path of the stud carried by the key not so manipulated, however, if an effort is made to depress both keys at the same time, their respective studs will engage against the bevel projections 166' and 166" of the member 166, locking the said keys against simultaneous effective manipulation.

Referring to Figures 4, 12 and 25, it will be noted that the keys 135 and 136 carry each a second laterally projecting stud 135" and 136", respectively, which normally stand above the path of the hook projections 133" on the upper edge of the slide bar 133, but when either key is depressed, the said second stud thereon is in a position such as to permit the corresponding hook projection 133" to pass above the said stud.

The bar 133 is positively connected with the lever 140 as shown in Figures 4, 9 and 12 wherein the stud 141$^c$, on which the pawl 141 is carried, projects into a slot 133''' cut into the lower edge of the bar 133 establishing a permanent connection between said parts. The bar 133 is therefore positively driven in its excursions which are made upon the first and last degrees of movement of the main actuator; thus it will be understood how the keys 135 and 136 are locked against manipulation when the main actuator is positioned otherwise than at normal.

Adjacent to the slide member 166 and mounted to slide on suitable supports is the bar 77 provided with bevel projections 77' and 77" which upon depression of the keys 135 or 136 are engaged to cause rearward movement of the bar 77, the end 77''' of which is adapted to engage the repeat key 142 at its lower end. By this action the bar 77 will rock the repeat key 142 on the stud 142$^b$, to disengage the same at its notch 142$^x$ from engagement with the keyboard top plate 124. This operation permits restoring action of the spring 142$^a$ (see Figure 4) to restore the key 142 to normal, presuming the said repeat key 142 is in the depressed position when the total or sub-total key is manipulated.

It is to be observed that the bar 77 is connected, pivotally, to the arm 132 of the bail A—262 and that depression of the clear key 19 rocks the shaft 45 (see Figure 11) and by the link 71$^a$ and projections 71$^{a'}$ swings the bail A—262 rearward carrying the slide bar 77 to engage its rear end 77''' against the lower end of the repeat key 142, provided the latter is depressed, as explained in connection with the operation of the total and sub-total keys. In this way the clear key is adapted to cause release of the repeat key from depressed position.

*Special devices for denominationalizing, counting and characterizing non-added items.*

Attention is called to Figure 9 wherein the denominationalizer key 9, and the elimination or non-add key 154, are shown in their depressed or operative positions. In this machine the denominationalizing instrumentalities are rendered operative when the key 9 is depressed.

The locking bars or zero index stops 120 have downward projections 120" (see Figure 9) which, when a numeral key 100 is depressed, engage a universal bar 80 suspended by the arms 81 and 82 from the transverse shaft 83 which is supported in suitable bearings in the side plates of the keyboard section of the machine. The arm 82 projects downward and its end 82' normally stands in the path of the ascending movement of the lever 49 but if a numeral key 100 is depressed the said end 82' is carried rearward and the lever 49 may operate to perform its regular function. Thus it is obvious that the item counter is inoperative except for effective operation of the accounting machine in handling regular accounting transactions, and that nonadded amounts will be denominationalized and counted.

It may be desirable to particularly characterize amounts which are not added in the amount register but are denominationalized, to accomplish which result the ordinary type carrier 706 and stop sector 727 are employed. The positioning of the stop sector is the only feature pertinent to the present invention. This is accomplished by means of the extension 158' of the sector positioning arm 158 which is loosely mounted on a hub 158$^a$ and adjacent to a rigid arm 157. The arm 157 is rigid on the hub 158$^a$ and the latter is pinned to the shaft 230.

The key 9 has a stud 9''' projecting laterally therefrom which engages the arm 84 on the left hand end of the shaft 85 which is supported in suitable bearings in the keyboard side plates (not shown). A second fixed arm 85$^a$ on the shaft 85 is connected with the bar 40 which carries a small cam plate 86 adapted to engage the bent-over end of the arm 158' and when the key 9 is depressed serves to position the sector 727 through the coacting parts 158.

Let us suppose that both the denominationalizing key 9 and the non-add key 154 are depressed as shown in Figure 9; now if key 154 be released the arm 158' will rise to the position indicated by the upper dotted lines and away from the plate 86 and will not be affected by manipulation of the key 9. If the key 9 be released the arm 158' will assume the position of the lower dotted lines, (because of the upward pull of the spring 157$^x$ connection 157 with the arm 158), and the sector 727 will, of course, be positioned to correspond with the different positions of the arm 158 as is well understood. This sector cooperates to position a characterizing type carrier such as set forth in the previously identified application of Mann and Hawley but which may be of a conventional form.

The bar 40 extends rearward of the keyboard and has an end 40' formed to trip a special type hammer (not shown) to cause the printing of a character to designate denominationalized items. When the key 9 is at normal, the bar 40 is drawn forward out of position to engage the said special hammer.

It is to be observed that by omitting the plate 86 nonadded-denominationalized items will not be especially characterized.

It will be remembered that manipulation of the nonadd or eliminating key 154 rocks the shaft 230 and by means of the arm 159 (see Fig. 4) moves the slide member 160 downward. This movement of the member 160 may be utilized if desired to prevent the counting or denominationalizing of eliminated items; thus referring to Figures 4, 7 and 25, the small sheet metal lug 160$^a$ may be attached to the lower end of the slide 160 in such a way as to engage the projection 49$^d$ of the lever 49 and prevent operating of the latter to release the member 11, after the manner as previously described in connection with the operation of total, and sub-total keys.

Having thus described my invention, what I claim as new is:—

1. In combination, an accounting machine including main registering mechanism and operating means therefor, an auxiliary calculating mechanism for making special computations respecting amounts of transactions of said registering mechanism and operating in conjunction with the latter and comprising a register, a separate item register for counting operations of the main registering and auxiliary calculating mechanisms, and means to render either of the said main or auxiliary mechanisms active conjointly with the item register.

2. In combination, an accounting machine including main registering mechanism and operating means therefor, an auxiliary calculating mechanism for making special computations respecting amounts of transactions of said registering mechanism and operating in conjunction with the latter and comprising a register, a separate item register for counting operations of the main registering and auxiliary calculating mechanisms, and means to render either of the said main or auxiliary mechanisms, or both of them, active conjointly with the item register.

3. In combination, an accounting machine including main registering mechanism and operating means therefor, an auxiliary calculating mechanism for making special computations respecting amounts of transactions of said registering mechanism and operating in conjunction with the latter and comprising a register, a separate item register for counting operations of the main registering and auxiliary calculating mechanisms, means to render either of the said main or auxiliary mechanisms active conjointly with the item register, clearing means for the main registering mechanism, separate clearing means common to the auxiliary calculating mechanism and item register, and means to render either of said clearing means operative from the main operating means of the accounting machine.

4. In combination, an accounting machine including main registering mechanism and operating means therefor, an auxiliary calculating mechanism for making special computations respecting amounts of transactions of said registering mechanism and operating in conjunction with the latter and comprising a register, a separate item register for counting operations of the main registering and auxiliary calculating mechanisms, means to render either of the said main or auxiliary mechanisms active conjointly with the item register, clearing means for the main registering mechanism, separate clearing means common to the auxiliary calculating mechanism and item register, and means to render either or both of said clearing means operative from the main operating means of the accounting machine.

5. In combination, an accounting machine including main registering mechanism and operating means therefor, an auxiliary calculating mechanism for making special computations respecting amounts of transactions of said registering mechanism and operating in conjunction with the latter and comprising a register, a separate item register for counting operations of the main registering and auxiliary calculating mechanisms, means to render either of the said main or auxiliary mechanisms active conjointly with the item register, clearing means for the main registering mechanism, separate clearing means common to the auxiliary calculating mechanism and item register, means to render either of said clearing means operative from the main operating means of the accounting machine, and means to disable the second named clearing mechanism relative to either the auxiliary calculating mechanism or the item register.

6. In combination, an accounting machine including main registering mechanism and operating means therefor, an auxiliary calculating mechanism for making special computations respecting amounts of transactions of said registering mechanism and operating in conjunction with the latter and comprising a register, a separate item register for counting operations of the main registering and auxiliary calculating mechanisms, an actuating device for said item register under the control of the operating means of the accounting machine, and means to at will prevent operation of said actuating device.

7. In combination, an accounting machine including main registering mechanism and operating means therefor, an auxiliary calculating mechanism for making special computations respecting amounts of transactions of said registering mechanism and operating in conjunction with the latter and comprising a register, a separate item register for counting operations of the main registering and auxiliary calculating mechanisms, means to render either of the said main or auxiliary mechanisms active conjointly with the item register, clearing means for the said main registering mechanism, auxiliary calculating mechanism and item register, and a controlling member for preventing action of said clearing means on the item register and to prevent registering action of said item register.

8. In an accounting machine, the combination of main registering mechanism and operating means therefor, an item register, operable in conjunction with said main registering mechanism for registering operations of the latter, clearing means for the item register, and a controlling member cooperative to prevent registering action of the item register and to govern the coaction between the clearing means and the item register.

9. In an accounting machine, the combination of main registering mechanism and operating means therefor, an item register, operable in conjunction with said main registering mechanism for registering operations of the latter, separate clearing means for the main and item registering instrumentalities, separate controlling devices for the said clearing means, manually controllable devices for connecting the said clearing means at will to the operating means first mentioned, and a manual controllable device for predetermining registering, clearing, and non-registering action of the item registering instrumentalities.

10. In an accounting machine, the combination of a calculating mechanism including a shaft and computing registers thereon, a separate register on said shaft, direct connections between the computing registers and the shaft for facilitating clearing of the registers, indirect connections between the shaft and the separate register for facilitating clearing of the latter, means to turn the shaft for clearing the registers, and means to render said indirect connections active and inactive.

11. In an accounting machine, the combination of a calculating mechanism including a shaft and computing registers thereon, a separate register on said shaft, direct connections between the computing registers and the shaft for facilitating clearing of the registers, indirect connections between the shaft and the separate register for facilitating clearing of the latter, means to turn the shaft for clearing the registers, means to render said indirect connections active and inactive, and means to operate the separate register independently of the shaft to clear the same.

12. In an accounting machine, the combination of a calculating mechanism including a shaft and computing registers thereon, a separate register on said shaft, direct connections between the computing registers and the shaft for facilitating clearing of the registers, indirect connections between the shaft and the separate register for facilitating clearing of the latter, gear driving devices for turning the shaft for clearing the computing registers, and means to shift said devices into connection with the separate register to clear the latter independently of the computing registers.

13. In an accounting machine, the combination of a calculating mechanism including a shaft and computing registers thereon, a separate register on said shaft, direct connections between the computing registers and the shaft for facilitating clearing of the registers, indirect connections between the shaft and the separate register for facilitating clearing of the latter, gear driving devices for turning the shaft, and manual controlling means to connect all of the registers to the shaft for clearing action incident to rotation of the shaft, and to prevent clearing action of the separate register during rotation of the shaft.

14. In an accounting machine, the combination of a calculating mechanism including a shaft and computing registers thereon, a separate register on said shaft, direct connections between the computing registers and the shaft for facilitating clearing of the registers, indirect connections between the shaft and the separate register for facilitating clearing of the latter, gear driving devices for turning the shaft, and manual controlling means to connect all of the registers to the shaft for clearing action incident to rotation of the shaft, and to cause interchangeable clearing action of the computing and separate registers.

15. In an accounting machine, the combination of a calculating mechanism including a shaft and computing registers thereon and keyed thereto, a separate register loosely mounted on the shaft, gear sectors one connected directly to the shaft and the other to the separate register, clearing mechanism involving a gear member operable to actuate either of the gear sectors for independent clearing of the respective registers, a connection between the shaft and said loosely mounted register, and means to render said connection active and inactive.

16. In an accounting machine, the combination of a calculating mechanism including a shaft and computing registers thereon and keyed thereto, a separate register loosely mounted on the shaft, gear sectors one connected directly to the shaft and the other to the separate register, clearing mechanism involving a gear member operable to actuate either of the gear sections for independent clearing of the respective registers, a connection between the shaft and said loosely mounted register, means to render said connection active and inactive, and a manually controllable connection between the loosely mounted register and its gear sector.

17. In an accounting machine, accumulating and listing devices, indexing and operating means therefor, a denominationalizing mechanism and a counting register for making special computations relative to transactions handled by the accumulating means, an instrumentality for preventing operation of the denominationalizing mechanism and counting register, actuating means for the preventing means controllable from the indexing means to incapacitate the preventing means, means to effect totaling operations of the accumulating and listing devices, and other action preventing means for the denominationalizing mechanism controllable from the totaling means.

18. In an accounting machine, the combination of accumulating mechanism, denominationalizing registers, predetermining and operating instrumentalities for the accumulating mechanism, means to control operation of the denominationalizing registers from the said operating means, characterizing means for transactions of the denominationalizing registers, means to disable the accumulating mechanism, and means to adjust the characterizing means from the said disabling means aforesaid.

19. In an accounting machine, the combination of accumulating mechanism, denominationalizing mechanism, predetermining and operating instrumentalities for the accumulating mechanism, means to control operation of the denominationalizing mechanism from the said operating means, characterizing means for transactions of the denominationalizing mechanism, means to disable the accumulating mechanism, means to adjust the characterizing means from the said disabling means aforesaid, and means to render the denominationalizing mechanism active or inactive also adapted to adjust said characterizing means.

20. In an accounting machine, the combination of accumulating mechanism, denominationalizing mechanism, predetermining and operating instrumentalities for the accumulating mechanism, means to control operation of the denominationalizing mechanism from the said operating means, characterizing means for transactions of the denominationalizing mechanism, means to disable the accounting mechanism, means to adjust the characterizing means from the said disabling means aforesaid, and means to render the denominationalizing mechanism active or inactive also adapted to adjust and actuate said characterizing means.

21. In combination, accumulating and listing mechanism, totaling means therefor, indexing and operating devices for said mechanism, special calculating mechanism for making computations respecting transactions of the accumulating mechanism, means normally preventing operation of the said special mechanism controllable from the indexing devices, and means to control the preventing means from the totaling means to maintain the preventing means active.

22. In combination, accumulating and listing mechanism, totaling means therefor, indexing and operating devices for said mechanism, special calculating mechanism for making computations respecting transactions of the accumulating mechanism, means normally preventing operation of the said special mechanism controllable from the indexing devices to render said special mechanism active, and means to thereafter render the special mechanism inactive on operation of the totaling means.

23. In combination, accumulating and listing mechanism, totaling means therefor, indexing and operating devices for said mechanism, special calculating mechanism for making computations respecting transactions of the accumulating mechanism, means normally preventing operation of the said special mechanism operable from the indexing devices to render said special mechanism active, and means to thereafter render the special mechanism inactive on operation of the totaling means by effecting normalization of the indexing devices.

24. In combination, an accounting machine including main registering mechanism and operating means therefor, an auxiliary calculating mechanism for making special computations respecting amounts of transactions of said registering mechanism, operating in conjunction with the latter, an item counter, and means for selectively establishing an operative relation between said item counter and said main and auxiliary calculating mechanisms respectively.

25. In combination with an accounting machine, denominationalizing and item counting devices, a clearing device, means to interchangeably connect the clearing device with the said denominationalizing and counting devices, and means to connect the item counting device with the denominationalizing device to move with the latter when being cleared and thus be cleared therewith.

26. In combination with an accounting machine, denominationalizing and item counting devices, a clearing device, means to interchangeably connect the clearing device with the said denominationalizing and counting devices, means to connect the item counting device with the denominationalizing device to move with the latter when being cleared and thus be cleared therewith, the last mentioned means including a manipulative member comprising a part adapted to prevent registering action of the item counting device.

27. In an accounting machine, the combination of a main actuator, an item counter and means to operate the same, a holding device to prevent normally the operation of the counter operating device, a locking bar for the holding device operable to unlock the holding device on each stroke of the main actuator, means other than the locking bar to maintain the holding device effective, and comprising special key mechanism for the accounting machine.

28. In an accounting machine, the combination of a main actuator, an item counter and means to operate the same, a holding device to prevent normally the operation of the counter operating device, a locking bar for the holding device operable to unlock the holding device on each stroke of the main actuator, and a manual device to prevent operation of the item counter notwithstanding unlocking of the holding device by the locking bar.

29. In an accounting machine, the combination of a main actuator, an item counter and means to operate the same, a holding device to prevent normally the operation of the counter operating device, a locking bar for the holding device operable to unlock the holding device on each stroke of the main actuator, means other than the locking bar to maintain the holding device effective, comprising special key mechanism for the accounting machine acting through the holding device, and a separate manual device acting directly upon the counter operating means and independently of the said holding device.

30. In an accounting machine, the combination of a main actuator, an item counter and means to operate the same, a holding device to prevent normally the operation of the counter operating device, a locking bar for the holding device operable to unlock the holding device on each stroke of the main actuator, and a correction key operable to maintain the holding device ineffective though the locking bar is ineffective for such purposes.

31. In an accounting machine, denominational registers, an item counter, means for clearing said registers and counter, and controlling mechanism including a single manually adjustable member to prevent clearing of the item counter when the denominational registers are being cleared, and to prevent counting action of the item counter.

32. In an accounting machine, denominational registers, an item counter, means for clearing said registers and counter, and controlling mechanism including a single manually adjustable member to prevent clearing of the item counter when the denominational registers are being cleared, to prevent counting action of the item counter, and adjustable to effect simultaneous clearing of the counter and denominational registers.

33. In an accounting machine comprising a governor controlling the operation thereof, an item counter, means preventing normally the operation of the counter, a releasing device for said preventing means, a clearing device for the counter, and means establishing operative relations between the last two devices and the governor.

34. In an accounting machine comprising a governor controlling the operation thereof, an item counter, means preventing normally the operation of the counter, a releasing device for said preventing means, a clearing device for the counter, and common means establishing operative relations between the last two devices and the governor including a governor connected shaft and cams on said shaft coacting with the releasing and clearing devices.

35. In an accounting machine, the combination with an accumulator and actuating means therefor including selective keys and differential levers, said levers being formed with auxiliary arms, of denominational registers, an item counter, and means operatively connected to the auxiliary arms of the differential levers to operate the denominational registers and item counter.

36. In an accounting machine, the combination with a main accumulator and actuating means therefor, of independent denominational registers, a special register operable conjointly with the denominational registers and accumulator, a disabling connection between the denominational registers and the special register, and a second disabling connection between one of the said registers and the accumulator actuating means.

37. In an accounting machine, the combination with a main accumulator and actuating means therefor, of denominational registers, a special register operable conjointly with the accumulator and denominational registers, a disabling connection between the accumulator actuating means and the denominational registers, and a second disabling connection between the denominational registers and the special register.

38. A machine of the character described including a main accumulator and operating means therefor, in combination with independent denominational registers, an item counting device, clearing mechanism for said item counting device and said denominational registers, an actuator for said clearing mechanisms, and connecting means operable at will to cause the movement of said actuator to effect the clearing of either or both of said denominational registers and said item register.

39. In combination, an accounting machine including main registering mechanism and operating means therefor, an auxiliary calculating mechanism for denominationalizing amounts of transactions of said registering mechanism and operating in conjunction with the latter, an item registering mechanism also operable by the accounting machine to count the operations of the denominationalizing mechanism, means for connecting the auxiliary mechanism and the item register to the operating means for operation simultaneously with the main registering mechanism, and means effective to cause the operation of said operating mechanism to effect separate or simultaneous clearing of said registering mechanisms.

In testimony whereof I affix my signature.

AMOS H. HAWLEY.